United States Patent
Onodera et al.

(10) Patent No.: US 9,641,062 B2
(45) Date of Patent: May 2, 2017

(54) SWITCHING POWER SUPPLY, METHOD FOR CONTROLLING SWITCHING POWER SUPPLY, AND POWER SUPPLY SYSTEM

(71) Applicant: FUJITSU LIMITED, Kawasaki-shi, Kanagawa (JP)

(72) Inventors: Koichi Onodera, Kawasaki (JP); Hiroshi Shimamori, Yokosuka (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 14/977,433

(22) Filed: Dec. 21, 2015

(65) Prior Publication Data

US 2016/0241144 A1    Aug. 18, 2016

(30) Foreign Application Priority Data

Feb. 12, 2015  (JP) ................. 2015-025347

(51) Int. Cl.

| | |
|---|---|
| *H02M 1/32* | (2007.01) |
| *H02M 1/36* | (2007.01) |
| *H02M 3/337* | (2006.01) |
| *H02M 1/00* | (2006.01) |

(52) U.S. Cl.

CPC ............... *H02M 1/32* (2013.01); *H02M 1/36* (2013.01); *H02M 3/337* (2013.01); *H02M 2001/0058* (2013.01); *Y02B 70/1433* (2013.01); *Y02B 70/1491* (2013.01)

(58) Field of Classification Search

CPC .......... H02M 1/32; H02M 2001/0058; H02M 3/155–3/158; H02M 3/1588; H02M 3/1563; Y02B 70/1433; Y02B 70/1466; Y02B 70/1491; G05F 1/42; G05F 1/46; G05F 1/52; G05F 1/63; G05F 1/607

USPC .................................................. 323/282–293

See application file for complete search history.

(56) References Cited

U.S. PATENT DOCUMENTS

| | | | | |
|---|---|---|---|---|
| 5,313,383 A | * | 5/1994 | Ikeuchi ................. | H02M 3/158 323/222 |
| 5,563,777 A | * | 10/1996 | Miki ..................... | H02M 1/425 315/224 |
| 9,425,700 B2 | * | 8/2016 | Lu ........................ | H02M 3/3376 |
| 9,455,640 B2 | * | 9/2016 | Ohtake ............. | H02M 3/33546 |

(Continued)

FOREIGN PATENT DOCUMENTS

JP          06-070593          3/1994

*Primary Examiner* — Yemane Mehari
(74) *Attorney, Agent, or Firm* — Fujitsu Patent Center

(57) ABSTRACT

A switching power supply includes: a resonant circuit; a switching circuit including a switching element and configured to supply a voltage to the resonant circuit; a smoothing circuit configured to smooth a voltage output from the resonant circuit and outputs an output voltage; a resonance controller configured to, when a control instruction signal is input, cause the switching element to be turned on and off at a first frequency in such a manner that the output voltage becomes a specific voltage; and a controller configured to discontinuously output the control instruction signal to the resonance controller at a second frequency after an operation instruction signal is input until the output voltage becomes higher than a threshold voltage, and continuously output the control instruction signal to the resonance controller after the output voltage becomes higher than the threshold voltage until the operation instruction signal is not input.

11 Claims, 20 Drawing Sheets

(56) References Cited

U.S. PATENT DOCUMENTS

2010/0230401 A1* 9/2010 Miyauchi ............... H05B 6/062
   219/665
2010/0258556 A1* 10/2010 Hayashi ................ H05B 6/065
   219/661

* cited by examiner

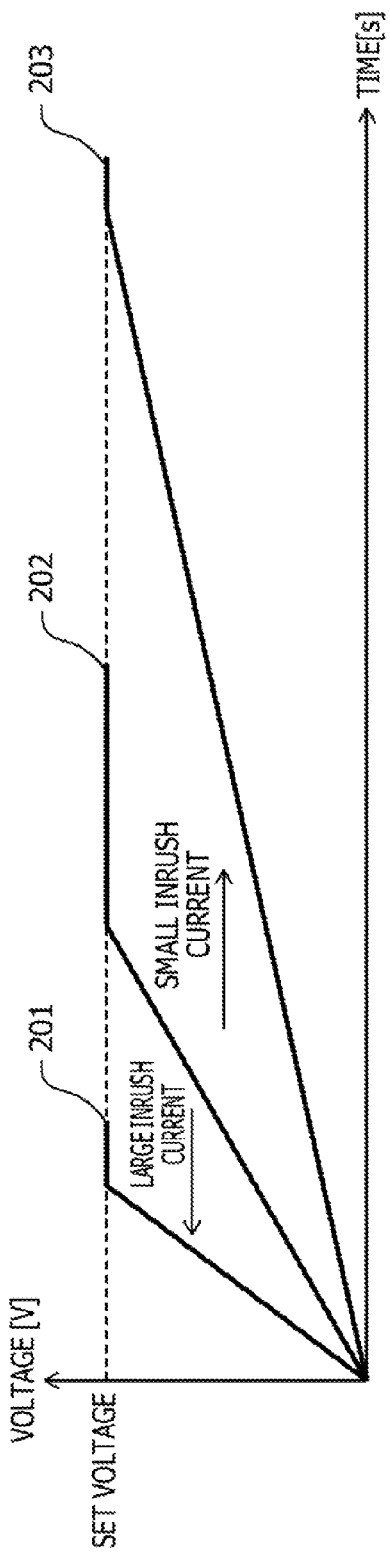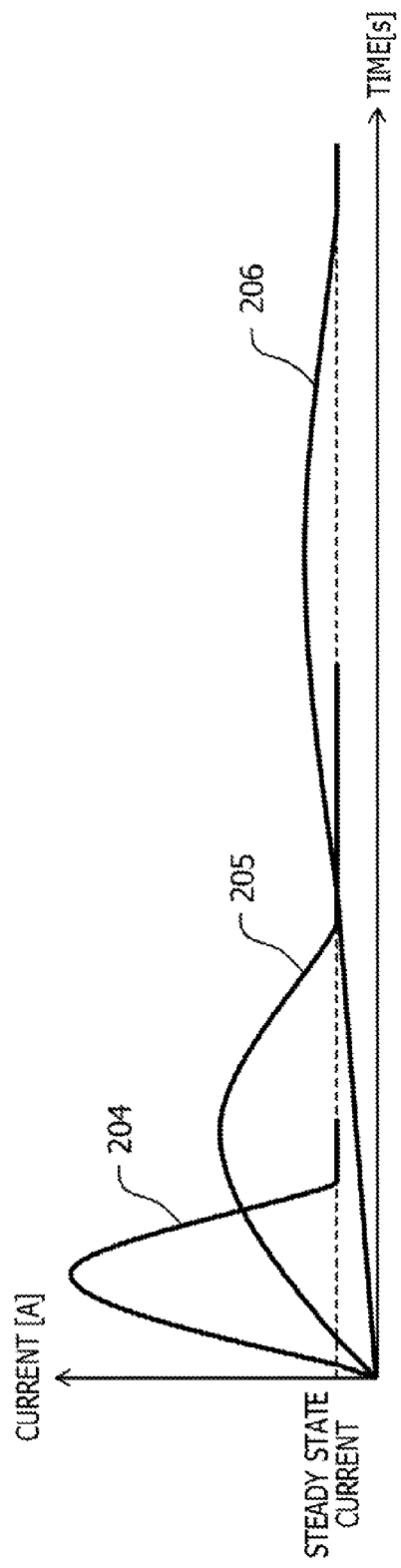

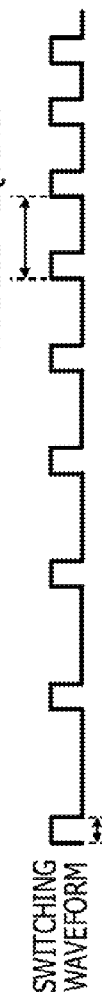
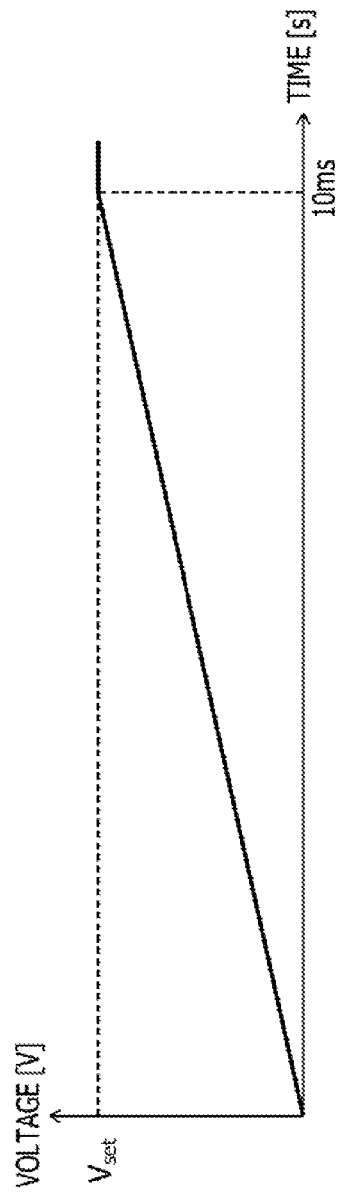
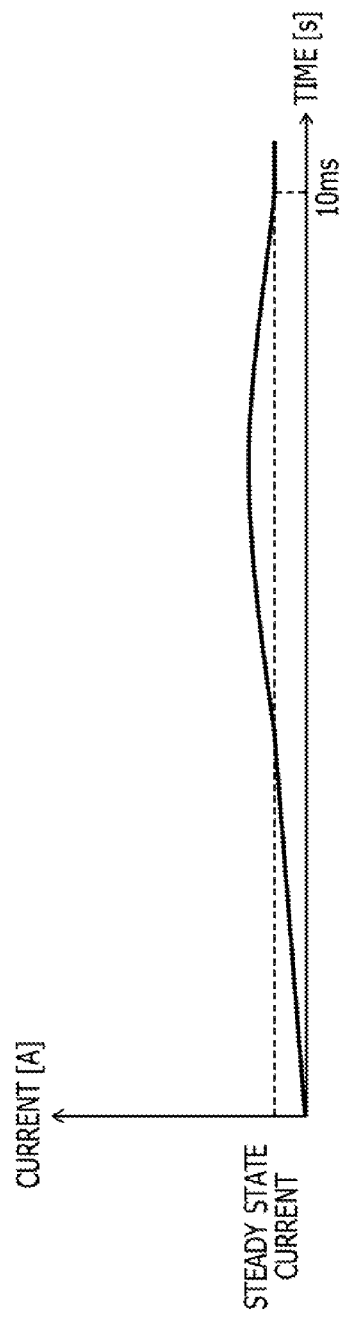
FIG. 4A
FIG. 4B
FIG. 4C

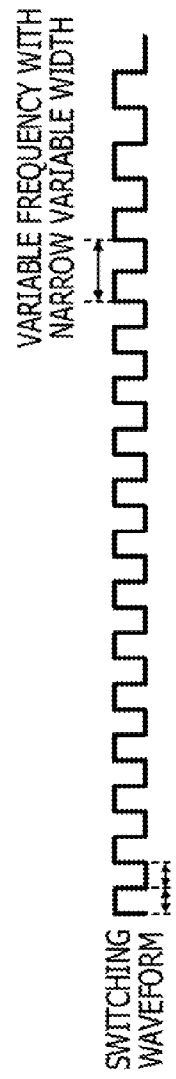
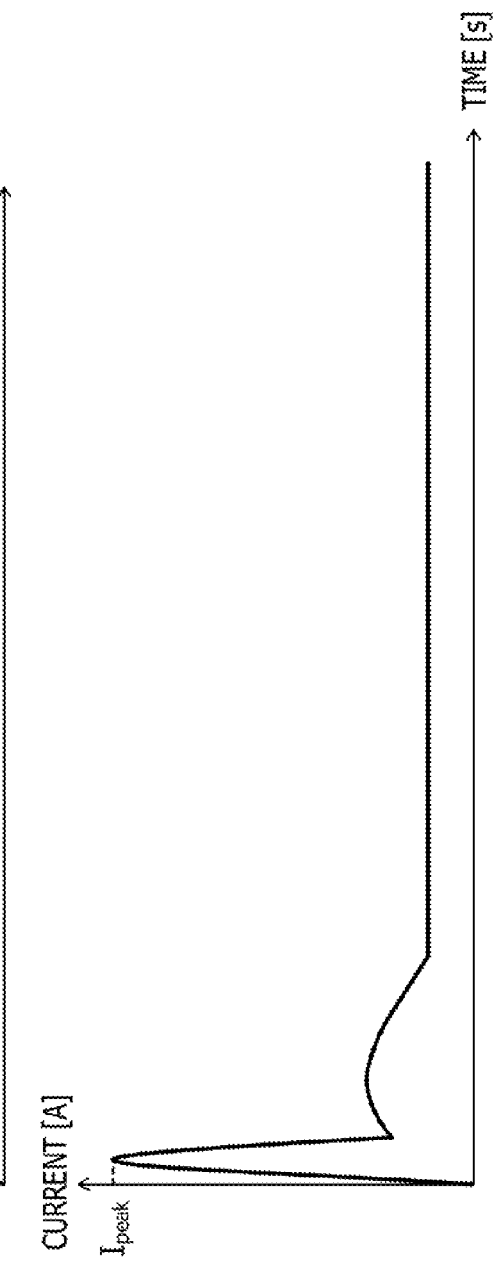
FIG. 6A
FIG. 6B
FIG. 6C

US 9,641,062 B2

SWITCHING POWER SUPPLY, METHOD FOR CONTROLLING SWITCHING POWER SUPPLY, AND POWER SUPPLY SYSTEM

CROSS-REFERENCE TO RELATED APPLICATIONS

This application is based upon and claims the benefit of priority of the prior Japanese Patent Application No. 2015-025347, filed on Feb. 12, 2015, the entire contents of which are incorporated herein by reference.

FIELD

The embodiments discussed herein are related to a switching power supply, a method for controlling the switching power supply, and a power supply system.

BACKGROUND

In power supplies which supply power to various apparatus, overcurrent flows upon start of supply of power to the apparatuses.

A related technique is described in Japanese Laid-open Patent Publication No. 6-70593.

SUMMARY

According to an aspect of the embodiments, a switching power supply includes: a resonant circuit including a capacitor and a coil coupled to the capacitor; a switching circuit including a switching element and configured to supply a voltage to the resonant circuit; a smoothing circuit configured to smooth a voltage output from the resonant circuit and outputs an output voltage; a resonance controller configured to, when a control instruction signal is input, cause the switching element to be turned on and off at a first frequency in such a manner that the output voltage becomes a specific voltage, the control instruction signal indicating to control the switching circuit; and a controller configured to discontinuously output the control instruction signal to the resonance controller at a second frequency being lower than the first frequency after an operation instruction signal is input until the output voltage becomes higher than a threshold voltage, and continuously output the control instruction signal to the resonance controller after the output voltage becomes higher than the threshold voltage until the operation instruction signal is not input, the operation instruction signal indicating to perform an operation.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 2A and 2B illustrate an exemplary relationship between rise transition time of output voltage and inrush current;

FIGS. 4A to 4C illustrate an exemplary soft start using pulse frequency modulation (PFM) control;

FIGS. 6A to 6C illustrate an exemplary relationship between output voltage and inrush current;

DESCRIPTION OF EMBODIMENTS

In a power supply which supplies power to various apparatuses, for example, a soft start of the power supply is performed to reduce an overcurrent flowing upon start of supply of power to the apparatuses.

In a power supply including a direct current (DC)/DC converter which performs DC/DC conversion by turning on/off a switching element, pulse width modulation (PWM) control or pulse frequency modulation (PFM) control is performed on the switching element, whereby a soft start is performed. For example, a resonant switching power supply, which is also called an LLC convertor, is controlled so that the duty ratio of a switching element is about 50%. Therefore, a soft start performed by performing PWM control or PFM control on the switching element may be hardly easy to be performed.

After the resonant switching power supply receives an operation instruction signal indicating an instruction to perform an operation, until the output voltage becomes higher than a threshold voltage, the resonant switching power supply discontinuously turns on/off the switching element which outputs a voltage to a resonant circuit, so that the output voltage is mildly raised. The resonant switching power supply discontinuously turns on/off the switching element which outputs a voltage to the resonant circuit, whereby a soft start is performed.

Figure 1:
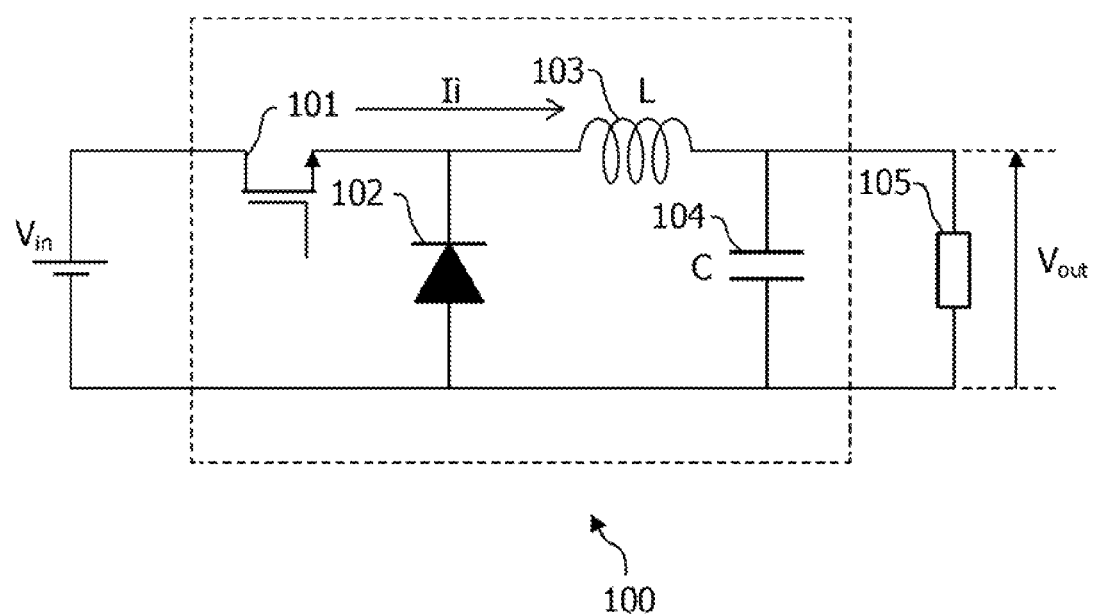
FIG. 1 illustrates an exemplary power supply including a direct current (DC)/DC converter.

FIG. 1 illustrates an exemplary power supply including a DC/DC converter.

A power supply 100 which includes a switching element 101, a diode 102, a coil 103, and a smoothing capacitor 104 decreases a received direct-current voltage $V_{in}$, and outputs an output voltage $V_{out}$ to a load 105. The output voltage $V_{out}$ is expressed by using the following expression, $$V_{out} = (T_{on}/T_{on}+T_{off}) \times V_{in}$$

where $T_{on}$ represents a time in which the switching element 101 is on in one cycle and $T_{off}$ represents a time in which the switching element 101 is off in one cycle. Upon startup, inrush current $I_i$ flows through the switching element 101 and the coil 103 in the power supply 100.

FIGS. 2A and 2B illustrate an exemplary relationship between rise transition time of output voltage and inrush current. FIGS. 2A and 2B are timing charts illustrating the relationship between rise transition time of the output voltage $V_{out}$ and the inrush current $I_i$ which is obtained upon startup of the power supply 100. FIG. 2A illustrates waveforms produced when the rise transition time of the output voltage $V_{out}$ is changed upon startup of the power supply 100. FIG. 2B illustrates the inrush current $I_i$. In FIG. 2A, the horizontal axis represents time, and the vertical axis represents the output voltage $V_{out}$. In FIG. 2B, the horizontal axis represents time, and the vertical axis represents the inrush current $I_i$. In FIG. 2A, a waveform 201 indicates a case in which the rise transition time is the shortest; a waveform 202 indicates a case in which the rise transition time is longer than that of the waveform 201; and a waveform 203 indicates a case in which the rise transition time is the longest. In FIG. 2B, a waveform 204 indicates the inrush current $I_i$ produced when the output voltage makes a transition as indicated by the waveform 201; a waveform 205 indicates the inrush current $I_i$ produced when the output voltage makes a transition as indicated by the waveform 202; and a waveform 206 indicates the inrush current $I_i$ produced when the output voltage makes a transition as indicated by the waveform 203.

As indicated by the waveform 201, when a rise in the output voltage $V_{out}$ occurs in a short time upon startup of the power supply 100, the inrush current $I_i$ becomes very large in comparison with a steady state current produced when the power supply 100 normally operates. When the inrush current $I_i$ becomes large, a trouble, such as degradation in the smoothing capacitor 104 and an input capacitor included in the load 105, or melting of a fuse included in the load 105, may occur. A soft start of the power supply 100 produces a longer rise transition time of the output voltage $V_{out}$ upon startup, as indicated by the waveforms 202 and 203. Therefore, the inrush current $I_i$ may be made smaller as indicated by the waveforms 205 and 206.

Figure 3A:
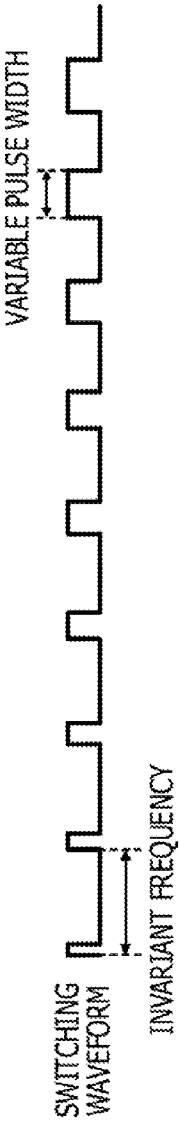
FIGS. 3A to 3C illustrate an exemplary soft start using pulse width modulation (PWM) control.
Figure 3B:
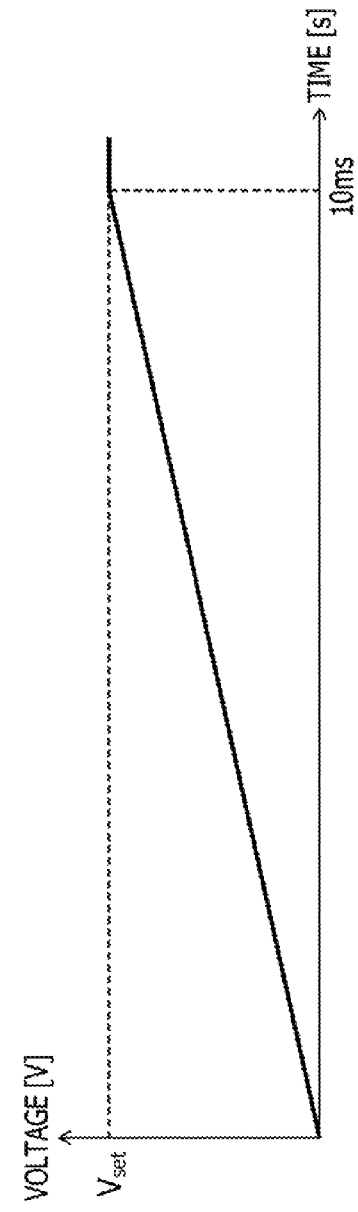
Figure 3C:
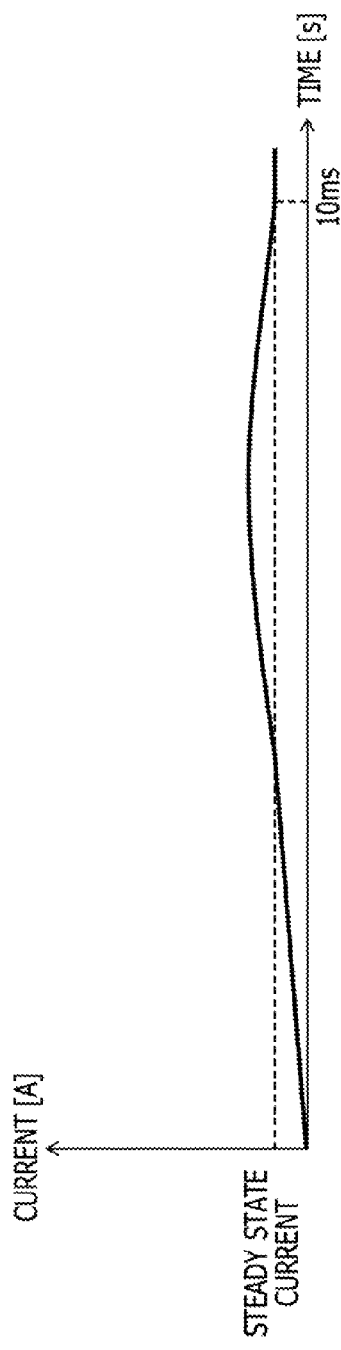

FIGS. 3A to 3C illustrate an exemplary soft start using PWM control. FIGS. 4A to 4C illustrate an exemplary soft start using PFM control. Each of FIGS. 3A and 4A illustrates a pulse signal applied to the switching element 101. FIG. 3B illustrates the output voltage $V_{out}$ of the power supply 100 which is produced when the pulse signal illustrated in FIG. 3A is applied to the switching element 101, and FIG. 4B illustrates that which is produced when the pulse signal illustrated in FIG. 4A is applied to the switching element 101. FIG. 3C illustrates the inrush current $I_i$ produced when the pulse signal illustrated in FIG. 3A is applied to the switching element 101, and FIG. 4C illustrates that produced when the pulse signal illustrated in FIG. 4A is applied to the switching element 101.

As illustrated in FIGS. 3A to 3C, the power supply 100 performs a soft start by gradually increasing the pulse width of the pulse signal applied to the switching element 101. As illustrated in FIGS. 4A to 4C, the power supply 100 performs a soft start by gradually increasing the frequency of the pulse signal applied to the switching element 101.

Figure 5A:
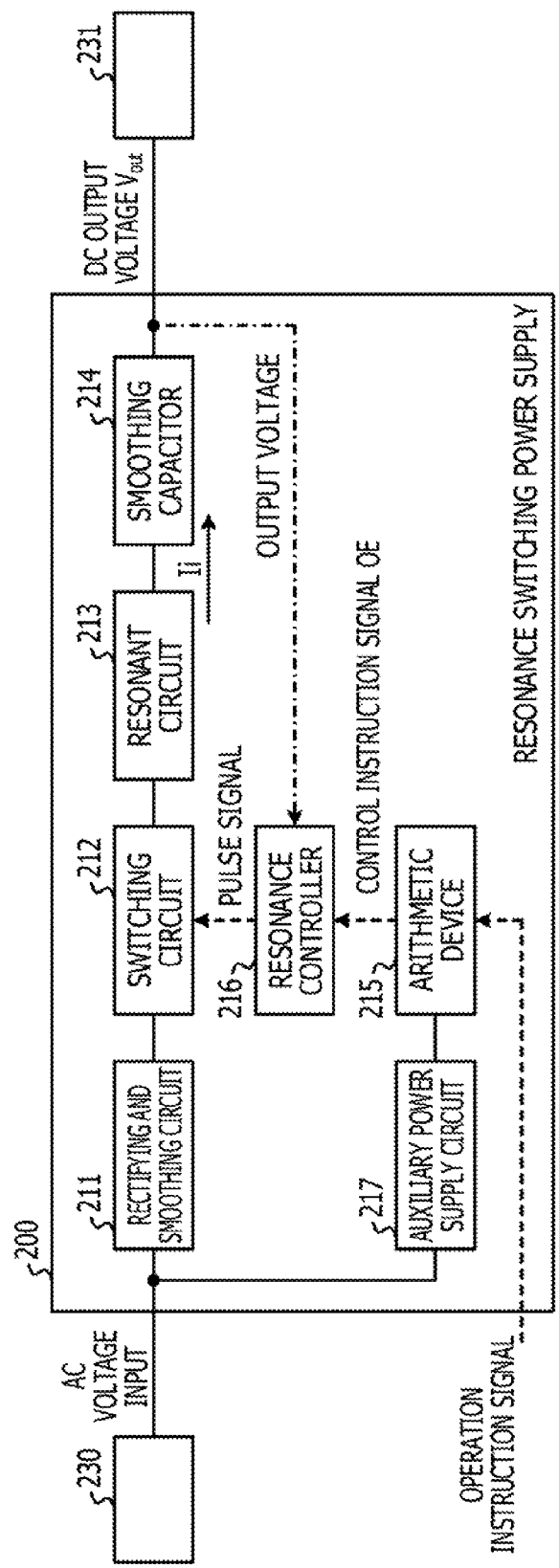
FIG. 5A illustrates an exemplary resonant switching power supply.
Figure 5B:
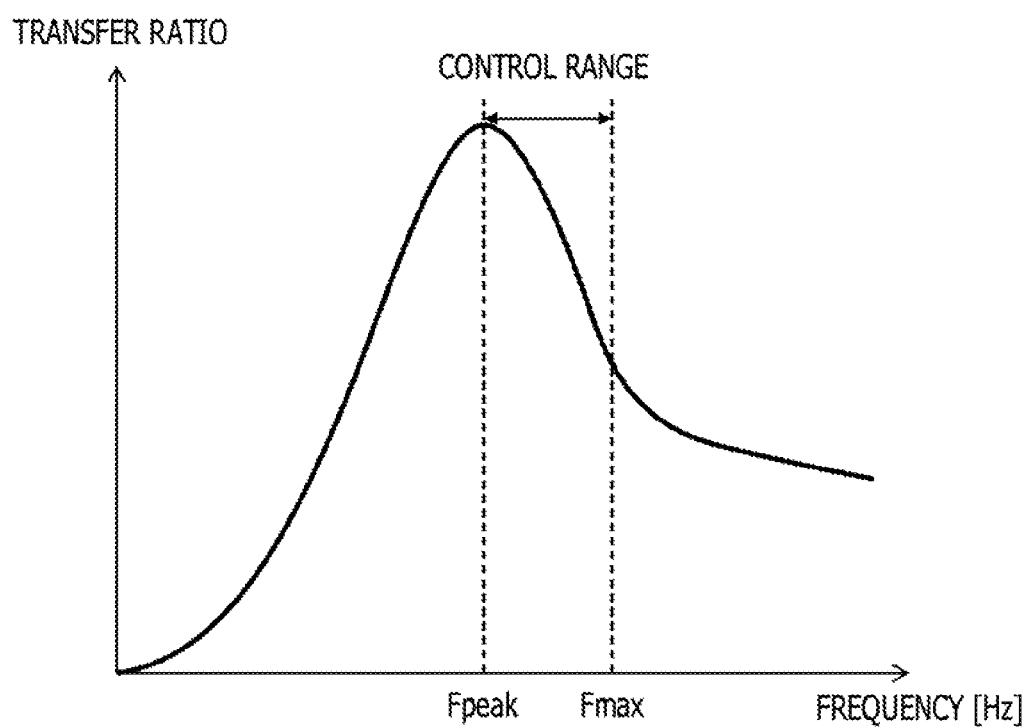
FIG. 5B illustrates exemplary frequency characteristics of the resonant switching power supply.

FIG. 5A illustrates an exemplary resonant switching power supply. FIG. 5B illustrates exemplary frequency characteristics of a resonant switching power supply. FIG. 5B illustrates frequency characteristics of the resonant switching power supply illustrated in FIG. 5A. In FIG. 5B, the horizontal axis represents the switching frequency of a switching element of the resonant switching power supply, and the vertical axis represents the transfer ratio of the resonant switching power supply.

A resonant switching power supply 200 includes a rectifying and smoothing circuit 211, a switching circuit 212, a resonant circuit 213, a smoothing capacitor 214, an arithmetic device 215, a resonance controller 216, and an auxiliary power supply circuit 217. The rectifying and smoothing circuit 211 includes a bridge rectifier circuit that rectifies an alternating voltage received from an alternate-current power supply 230, and a rectified-voltage smoothing capacitor that smooths the voltage rectified by the bridge rectifier circuit. The switching circuit 212, which includes a pair of switching elements which are complementarily turned on/off in accordance with a pulse signal whose duty ratio is 50%, receives a voltage rectified and smoothed by the rectifying and smoothing circuit 211. The resonant circuit 213 includes a capacitor coupled to the switching circuit 212, a transformer coupled in series or in parallel with the capacitor, and diodes coupled to secondary coils of the transformer. The resonant circuit 213 includes an LC circuit including the capacitor and the primary coil of the transformer. The resonant circuit 213 decreases the voltage which the switching circuit 212 outputs by turning on/off at a frequency close to the resonant frequency of the LC circuit, in accordance with the voltage ratio, for example, illustrated in FIG. 5B, and outputs the resulting voltage. The smoothing capacitor 214 smooths the voltage received from the resonant circuit 213, and outputs the output voltage $V_{out}$ to a load 231. The arithmetic device 215 causes the resonant switching power supply 200 to operate. In addition, the arithmetic device 215 monitors the operation state of the resonant switching power supply 200, and notifies a host control apparatus of the operation state of the resonant switching power supply 200. When the arithmetic device 215 receives an operation instruction signal from the host control apparatus, the arithmetic device 215 outputs a control instruction signal OE to the resonance controller 216. When the resonance controller 216 receives the control instruction signal OE from the arithmetic device 215, the resonance controller 216 outputs a pulse signal whose duty ratio is 50% and controls the switching circuit 212 so that the output voltage $V_{out}$ which is output from the smoothing capacitor 214 to the load 231 becomes invariant. The resonance controller 216 controls the switching circuit 212 in the control range indicated by using a double-headed arrow in FIG. 5B so that the output voltage $V_{out}$ which is output from the smoothing capacitor 214 becomes invariant. For example, the resonance controller 216 performs PFM control on the switching circuit 212 between a lower-limit frequency $F_{peak}$ which is approximately equal to the resonant frequency of the resonant circuit 213 and an upper-limit frequency $F_{max}$ which is the upper-limit frequency under which the transfer ratio is linearly changed. When the resonance controller 216 controls the switching circuit 212 at the upper-limit frequency $F_{max}$, the output voltage $V_{out}$ becomes a maximum control voltage $V_{set}$. When the resonance controller 216 controls the switching circuit 212 at the lower-limit frequency $F_{peak}$, the output voltage $V_{out}$ becomes a minimum control voltage $V_{ctrl}$. The auxiliary power supply circuit 217 supplies a power supply voltage to the arithmetic device 215.

In the resonant switching power supply 200, the switching circuit 212 is turned on/off at a frequency close to the resonant frequency of the resonant circuit 213. Therefore, a soft switching operation using an about-zero voltage or current may be performed, and power consumption occurring upon switching may be reduced. The resonant switching power supply 200 controls the switching circuit 212 by using a pulse signal whose duty ratio is 50%. Therefore, a soft start based on PWM control may be hardly easy to perform upon startup. When the output voltage $V_{out}$ is raised from 0 V upon startup, the resonance controller 216 does not start PFM control until the output voltage $V_{out}$ exceeds the minimum control voltage $V_{ctrl}$. Therefore, a soft start based on PFM control between 0 V and the minimum control voltage $V_{ctrl}$ may be hardly easy to perform.

FIGS. 6A to 6C illustrate an exemplary relationship between output voltage and inrush current. FIGS. 6A to 6C illustrate the relationship between output voltage and inrush current which is obtained upon startup of the resonant switching power supply 200. FIG. 6A illustrates a pulse signal applied to the switching circuit 212. FIG. 6B illustrates the output voltage $V_{out}$ of the resonant switching power supply 200 which is produced when the pulse signal illustrated in FIG. 6A is applied to the switching circuit 212. FIG. 6C illustrates the inrush current $I_i$ produced when the pulse signal illustrated in FIG. 6A is applied to the switching circuit 212.

As illustrated in FIGS. 6A to 6C, the resonant switching power supply 200 does not control the output voltage $V_{out}$ based on PFM control until the output voltage $V_{out}$ becomes the minimum control voltage $V_{ctrl}$. Therefore, the maximum value $I_{peak}$ of the inrush current $I_i$ may be large.

For example, a resonant switching power supply which enables a soft start may be provided. For example, in resonant switching, the switching elements which output a voltage to the resonant circuit may be discontinuously turned on/off after an operation instruction signal is received, until the output voltage is raised to the threshold voltage, and the output voltage may be mildly raised, whereby a soft start may be performed.

Figure 7:
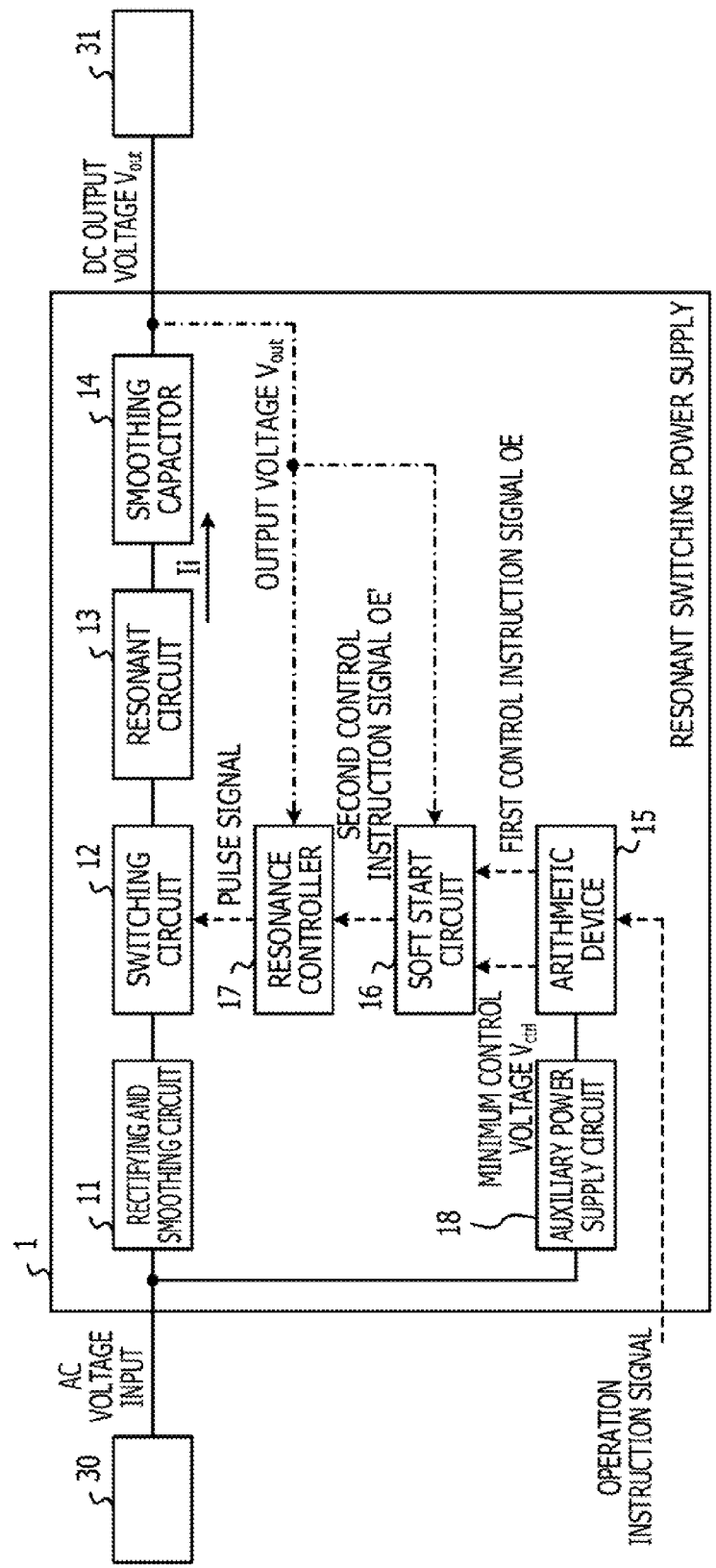
FIG. 7 illustrates an exemplary resonant switching power supply.
Figure 8:
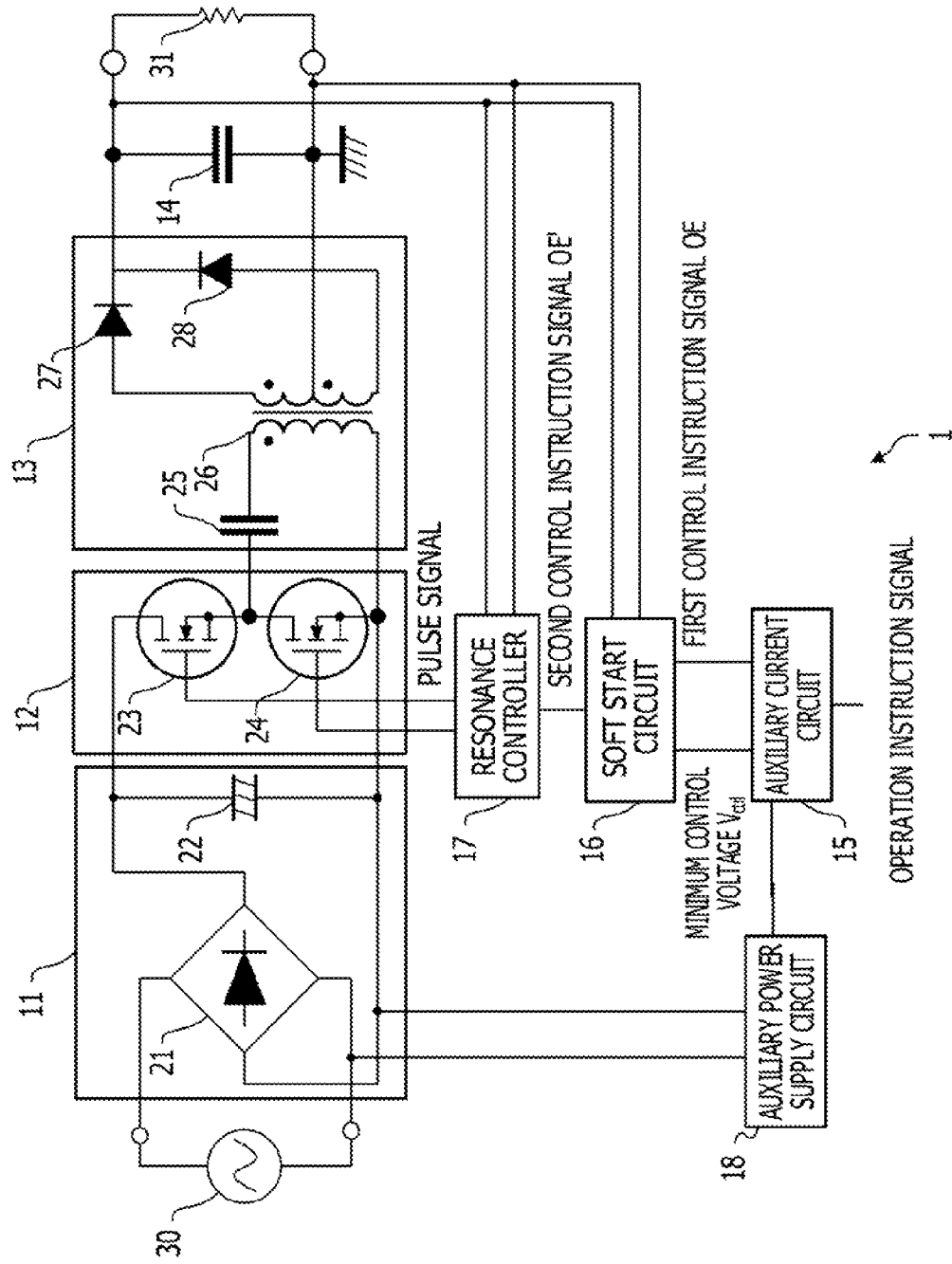
FIG. 8 illustrates an exemplary resonant switching power supply.

FIGS. 7 and 8 illustrate an exemplary resonant switching power supply. FIG. 8 illustrates a detailed circuit block of the resonant switching power supply illustrated in FIG. 7.

A resonant switching power supply 1 includes a rectifying and smoothing circuit 11, a switching circuit 12, a resonant circuit 13, a smoothing capacitor 14, an arithmetic device 15, a soft start circuit 16, a resonance controller 17, and an auxiliary power supply circuit 18. The rectifying and smoothing circuit 11 rectifies and smooths a received alternating voltage, and outputs the resulting voltage to the switching circuit 12. The switching circuit 12 includes switching elements which turn on/off the voltage received by the resonant circuit 13. The resonant circuit 13 includes a capacitor and a coil coupled to the capacitor. The smoothing capacitor 14 smooths the voltage which is output from the resonant circuit 13, and outputs the output voltage. When the resonance controller 17 receives a control instruction signal indicating an instruction to control the switching circuit 12, the resonance controller 17 turns on/off the switching elements at a first frequency so that the output voltage becomes a certain value. The arithmetic device 15 and the soft start circuit 16 may correspond to, for example, a control instructing unit. The control instructing unit discontinuously outputs a control instruction signal to the resonance controller 17 at a second frequency which is lower than the first frequency, after an operation instruction signal indicating an instruction to perform an operation is received, until the output voltage becomes higher than the threshold voltage. The control instructing unit continuously outputs a control instruction signal to the resonance controller 17 after the output voltage becomes higher than the threshold voltage, until the operation instruction signal is not received.

The rectifying and smoothing circuit 11 includes a bridge rectifier circuit 21 that rectifies an alternating voltage received from the alternate-current power supply 30, and a rectified-voltage smoothing capacitor 22 that smooths the voltage rectified by the bridge rectifier circuit 21. The rectifying and smoothing circuit 11 rectifies the alternating voltage received from the alternate-current power supply 30, smooths the rectified voltage, and outputs the resulting voltage to the switching circuit 12. The switching circuit 12 includes a first switching element 23 and a second switching element 24 coupled in series with the first switching element 23. The first switching element 23 has a first end coupled to a first end of the rectified-voltage smoothing capacitor 22, and the second switching element 24 has a first end coupled to a second end of the rectified-voltage smoothing capacitor 22. The first switching element 23 and the second switching element 24 each are an n metal oxide semiconductor field-effect transistor (nMOSFET), and are complementarily turned on/off in accordance with the pulse signal whose duty ratio is 50% and which is received from the resonance controller 17. For example, when the first switching element 23 is turned on, the second switching element 24 is turned off. When the first switching element 23 is turned off, the second switching element 24 is turned on. The resonant circuit 13 includes a resonant capacitor 25, a transformer 26, a first rectifier diode 27, and a second rectifier diode 28. The resonant capacitor 25 has a first end coupled to both of second ends of the first switching element 23 and the second switching element 24, and has a second end coupled to a first end of the primary coil of the transformer 26. One of secondary coils of the transformer 26 has a first end coupled to the anode of the first rectifier diode 27, and the other of the secondary coils of the transformer 26 has a first end coupled to the anode of the second rectifier diode 28. Second ends of both of the secondary coils of the transformer 26 are grounded. The cathodes of the first rectifier diode 27 and the second rectifier diode 28 are coupled to a first end of the smoothing capacitor 14. The resonant capacitor 25 and the primary coil of the transformer 26 may form an LC circuit. The first switching element 23 and the second switching element 24 are turned on/off at a frequency close to the resonant frequency of the LC circuit formed in the resonant circuit 13, whereby the voltage received by the switching circuit 12 is decreased, and is output from the resonant circuit 13. The smoothing capacitor 14 may be a smoothing circuit which smooths the voltage received from the resonant circuit 13, and which outputs the resulting voltage to a load 31 as the output voltage $V_{out}$.

The arithmetic device 15 which includes a CPU, a memory, and an I/O circuit operates the resonant switching power supply 1, and monitors the operation state of the resonant switching power supply 1 so as to notify a host control apparatus of the operation state of the resonant switching power supply 1. When the arithmetic device 15 receives an operation instruction signal from the host control apparatus, the arithmetic device 15 outputs the minimum control voltage $V_{ctrl}$ and a first control instruction signal OE which is, for example, a signal at the H level, to the soft start circuit 16.

Figure 9:
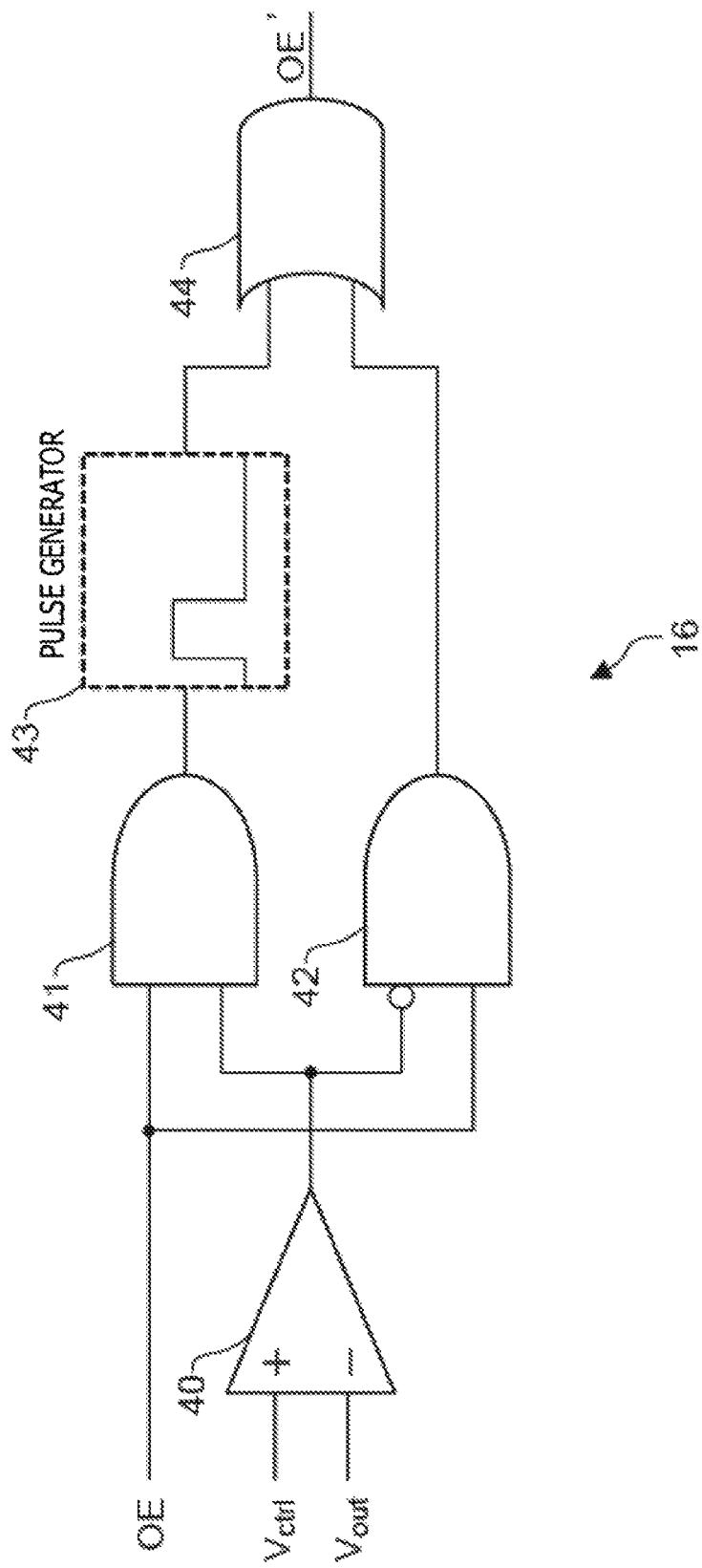
FIG. 9 illustrates an exemplary soft start circuit.

FIG. 9 illustrates an exemplary soft start circuit. The soft start circuit illustrated in FIG. 9 may be the soft start circuit illustrated in FIG. 7.

The soft start circuit 16 includes a comparator 40, a first AND element 41, a second AND element 42, a pulse generator 43, and an OR element 44. The comparator 40 receives the minimum control voltage $V_{ctrl}$ corresponding to the lower-limit frequency $F_{peak}$ which is approximately equal to the resonant frequency of the resonant circuit 13, at one of the input terminals thereof as a threshold voltage. The comparator 40 receives the output voltage $V_{out}$ at the other of the input terminals. When the output voltage $V_{out}$ is lower than the minimum control voltage $V_{ctrl}$, the comparator 40 output, for example, an H-level signal. When the output voltage $V_{out}$ is higher than the minimum control voltage $V_{ctrl}$, the comparator 40 outputs, for example, an L-level signal. When the first AND element 41 receives H-level signals at both of the input terminals, the first AND element 41 outputs, for example, an H-level signal. When the first AND element 41 receives an L-level signal at either of the input terminals, the first AND element 41 outputs, for example, an L-level signal. In the case where the second AND element 42 receives the first control instruction signal OE which is an H-level signal and where the second AND element 42 receives an L-level signal from the comparator 40, the second AND element 42 outputs, for example, an H-level signal. In the case where the second AND element 42 does not receive the first control instruction signal OE or where the second AND element 42 receives an H-level signal from the comparator 40, the second AND element 42 outputs an L-level signal. One of the input terminals of the first AND element 41 and that of the second AND element 42 are coupled to the output terminal of the comparator 40, whereby the first AND element 41 and the second AND element 42 may function as a selector circuit. When the comparator 40 receives the output voltage $V_{out}$ which is lower than the minimum control voltage $V_{ctrl}$ so as to output an H-level signal, the first control instruction signal OE is output via the first AND element 41. When the comparator 40 receives the output voltage $V_{out}$ which is higher than the minimum control voltage $V_{ctrl}$ so as to output an L-level signal, the first control instruction signal OE is output via the second AND element 42.

The pulse generator 43 which is coupled to the output terminal of the first AND element 41 outputs a pulse signal having a certain period while receiving an H-level signal from the output terminal of the first AND element 41. For example, the pulse generator 43 may include a divider circuit and a logic circuit. The frequency of the pulse signal generated by the pulse generator 43 may be 33.3 kHz, and the duty ratio may be 0.33. The frequency of the pulse signal which is output by the resonance controller 17 is, for example, 500 kHz, and the frequency of the pulse signal generated by the pulse generator 43 may be lower than that of the pulse signal generated by the resonance controller 17. The OR element 44 receives the output signal from the second AND element 42 and the output signal from the pulse generator 43.

When the first AND element 41 and the second AND element 42 receive an L-level signal from the arithmetic device 15, for example, when the first control instruction signal OE is not received from the arithmetic device 15, the soft start circuit 16 outputs an L-level signal. In the case where the soft start circuit 16 receives the first control instruction signal OE from the arithmetic device 15 and where the output voltage $V_{out}$ is lower than the minimum control voltage $V_{ctrl}$, the soft start circuit 16 discontinuously outputs a second control instruction signal OE' in accordance with the period of the pulse signal generated by the pulse generator 43. In contrast, in the case where the first AND element 41 and the second AND element 42 receive the first control instruction signal OE from the arithmetic device 15 and where the output voltage $V_{out}$ is higher than the minimum control voltage $V_{ctrl}$, the soft start circuit 16 continuously outputs the second control instruction signal OE'. The second control instruction signal OE' is a control instruction signal indicating an instruction to control the switching circuit 12.

The resonance controller 17 receives the output voltage $V_{out}$ from the smoothing capacitor 14 and receives the second control instruction signal OE' from the soft start circuit 16. When the resonance controller 17 receives the second control instruction signal OE' from the soft start circuit 16, the resonance controller 17 complementarily turns on/off the first switching element 23 and the second switching element 24 based on the pulse signal whose duty ratio is 50% so that the output voltage $V_{out}$ becomes a certain voltage. When the resonance controller 17 discontinuously receives the second control instruction signal OE' from the soft start circuit 16, the resonance controller 17 discontinuously turns on/off the first switching element 23 and the second switching element 24. When the resonance controller 17 continuously receives the second control instruction signal OE' from the soft start circuit 16, the resonance controller 17 continuously turns on/off the first switching element 23 and the second switching element 24.

The auxiliary power supply circuit 18 receives the alternating voltage from the alternate-current power supply 30, and supplies a power supply voltage to the arithmetic device 15.

Figure 10:
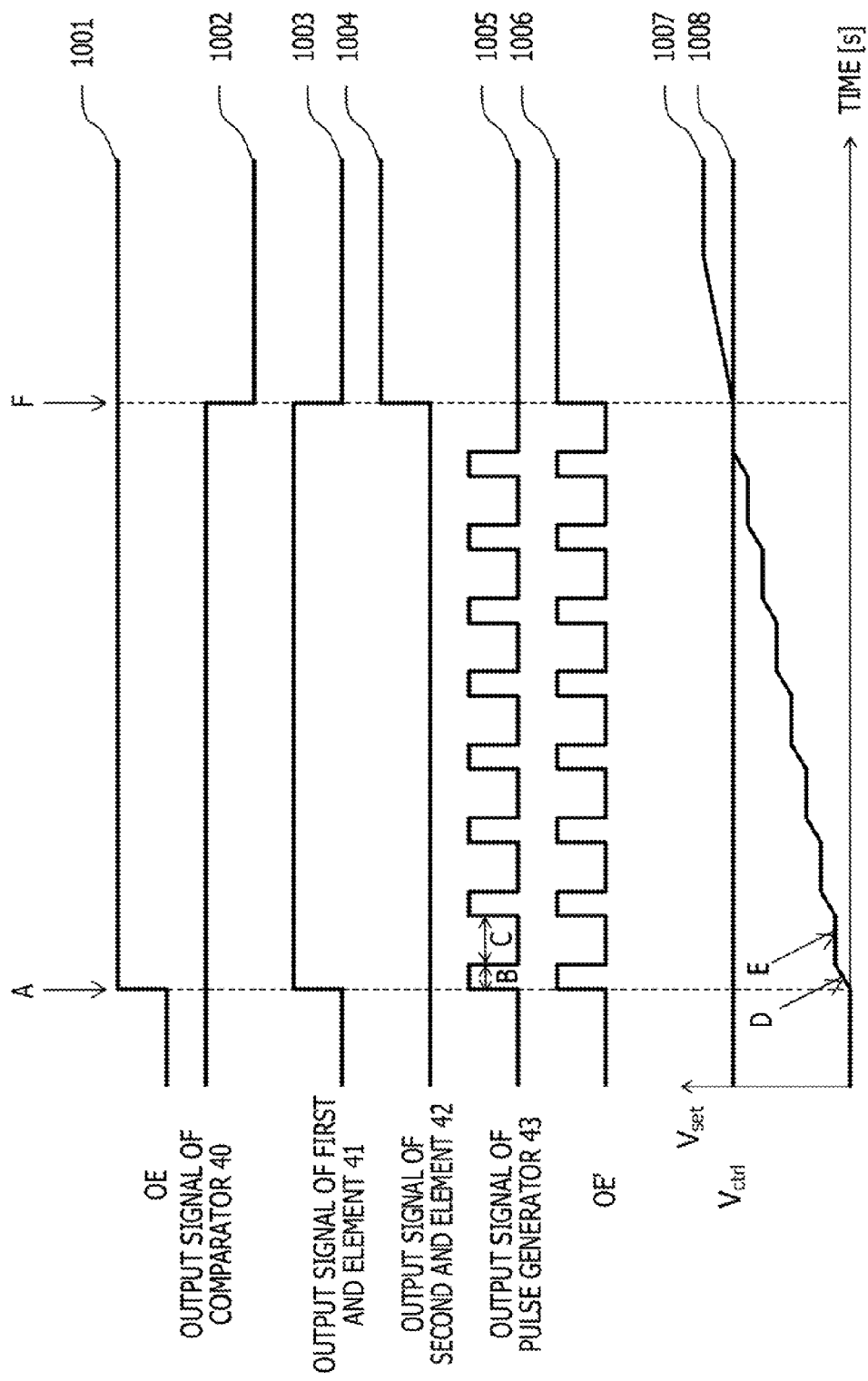
FIG. 10 illustrates an exemplary startup operation of a resonant switching power supply.

FIG. 10 illustrates an exemplary startup operation of the resonant switching power supply. The resonant switching power supply illustrated in FIG. 7 may perform the startup operation illustrated in FIG. 10. In FIG. 10, a waveform 1001 is a waveform of the signal input to the soft start circuit 16 from the arithmetic device 15; a waveform 1002 is a waveform of the output signal from the comparator 40; a waveform 1003 is a waveform of the output signal from the first AND element 41; a waveform 1004 is a waveform of the output signal from the second AND element 42; a waveform 1005 is a waveform of the output signal from the pulse generator 43; a waveform 1006 is a waveform of the output signal from the OR element 44; a waveform 1007 is a waveform of the output voltage $V_{out}$; and a waveform 1008 is a waveform of the minimum control voltage $V_{ctrl}$.

At the time point indicated by using an arrow A, when the arithmetic device 15 receives an operation instruction signal from the host control apparatus, the arithmetic device 15 outputs the first control instruction signal OE which is an H-level signal, to the first AND element 41 and the second AND element 42 of the soft start circuit 16. At that time, the output voltage $V_{out}$ of the resonant switching power supply 1 is 0 V, which is lower than the minimum control voltage $V_{ctrl}$. Therefore, the comparator 40 outputs an H-level signal. Since the first AND element 41 receives H-level signals at both of the input terminals, the output signal from the first AND element 41 makes a transition from the L level to the H level. Since the second AND element 42 receives an H-level signal from the comparator 40, the second AND element 42 continues to output an L-level signal. The pulse generator 43 starts generating a pulse signal by receiving an H-level signal from the first AND element 41. The OR element 44 outputs the second control instruction signal OE' while the pulse signal generated by the pulse generator 43 is at the H level as indicated by using a double-headed arrow B. The OR element 44 does not output the second control instruction signal OE' while the pulse signal generated by the pulse generator 43 is at the L level as indicated by using a double-headed arrow C. For example, the OR element 44 discontinuously outputs the second control instruction signal OE' to the resonance controller 17 in accordance with the period of the pulse signal generated by the pulse generator 43.

While receiving the second control instruction signal OE' from the soft start circuit 16, the resonance controller 17 outputs a pulse signal whose duty ratio is 50% so that the first switching element 23 and the second switching element 24 are turned on/off. As indicated by using an arrow D, while the first switching element 23 and the second switching element 24 are turned on/off, the output voltage $V_{out}$ is raised. As indicated by using an arrow E, when the first switching element 23 and the second switching element 24 are not turned on/off, the output voltage $V_{out}$ is kept invariant.

After that, the soft start circuit 16 discontinuously outputs the second control instruction signal OE' to the resonance controller 17 in certain cycles until the output voltage $V_{out}$ becomes higher than the minimum control voltage $V_{ctrl}$. While receiving the second control instruction signal OE', the resonance controller 17 outputs the pulse signal to the first switching element 23 and the second switching element 24, and the output voltage $V_{out}$ is raised while the first switching element 23 and the second switching element 24 are turned on/off. When the resonance controller 17 does not receive the second control instruction signal OE', the resonance controller 17 does not output the pulse signal to the first switching element 23 and the second switching element 24, and the output voltage $V_{out}$ is kept invariant. The output voltage $V_{out}$ is discontinuously raised until the output voltage $V_{out}$ becomes higher than the minimum control voltage $V_{ctrl}$.

At the time point indicated by using an arrow F, when the output voltage $V_{out}$ of the resonant switching power supply 1 becomes higher than the minimum control voltage $V_{ctrl}$, the output signal from the comparator 40 makes a transition from the H level to the L level. When the output signal from the comparator 40 makes a transition to the L level, the output signal from the first AND element 41 makes a transition from the H level to L level, and the output signal from the second AND element 42 makes a transition from the L level to the H level. When the output signal from the first AND element 41 makes a transition to the L level, the pulse generator 43 stops generating the pulse signal. When the output signal from the second AND element 42 makes a transition to the H level, the OR element 44 continuously outputs the second control instruction signal OE' until the signal received from the arithmetic device 15 is switched to the L level, for example, until the first control instruction signal OE is not received.

Figure 11:
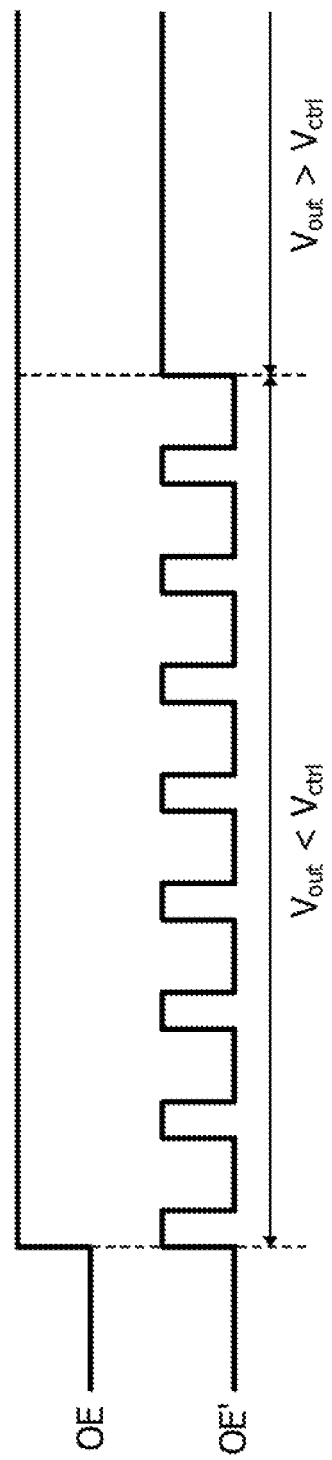
FIG. 11 illustrates an exemplary relationship between a first control instruction signal and a second control instruction signal.

FIG. 11 illustrates the relationship between the first control instruction signal and the second control instruction signal. The control signals illustrated in FIG. 11 may be the first control instruction signal OE and the second control instruction signal OE' illustrated in FIG. 7. The soft start circuit 16 discontinuously outputs the second control instruction signal OE' after the soft start circuit 16 receives the first control instruction signal OE, until the output voltage $V_{out}$ becomes higher than the minimum control voltage $V_{ctrl}$. When the output voltage $V_{out}$ becomes higher than the minimum control voltage $V_{ctrl}$ after the soft start circuit 16 receives the first control instruction signal OE, the soft start circuit 16 continuously outputs the second control instruction signal OE' until the soft start circuit 16 does not receive the first control instruction signal OE.

Figure 12A:
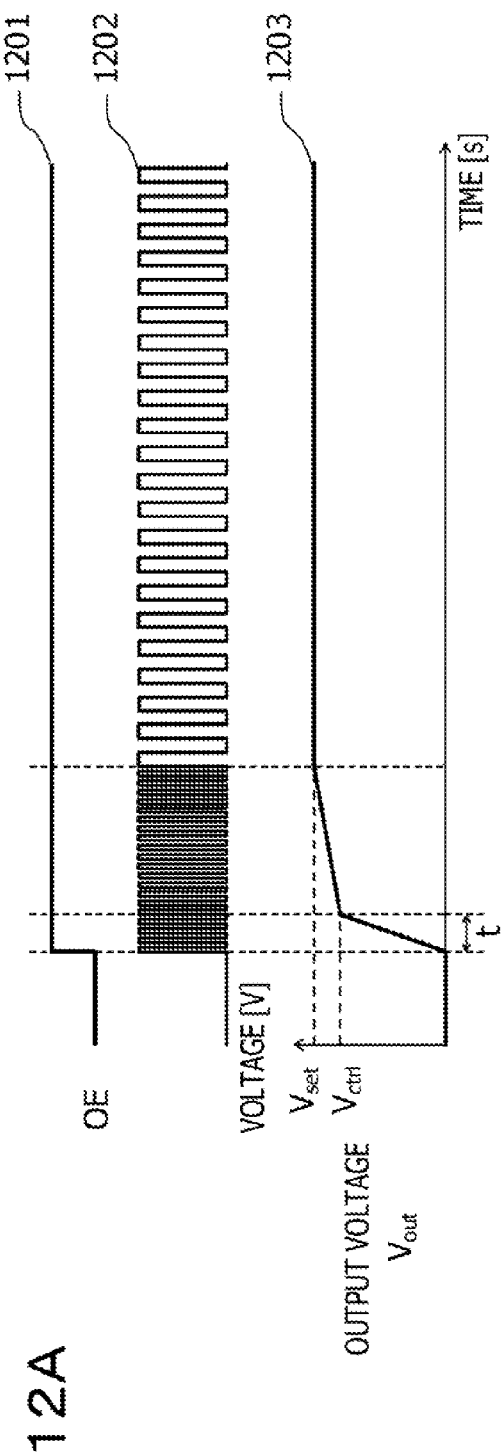
FIGS. 12A and 12B illustrate exemplary startup operations of resonant switching power supplies.
Figure 12B:
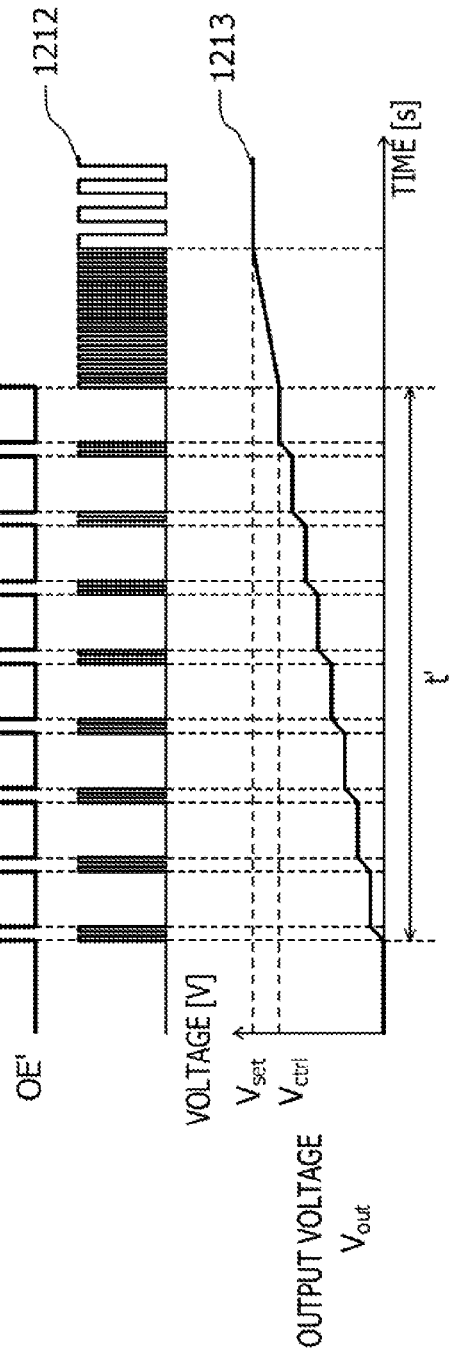

FIGS. 12A and 12B illustrate exemplary startup operations of the resonant switching power supplies. FIG. 12A is a timing chart illustrating an operation performed upon startup of the resonant switching power supply 200 illustrated in FIG. 5. FIG. 12B is a timing chart illustrating an operation performed upon startup of the resonant switching power supply 1 illustrated in FIG. 7. In FIGS. 12A and 12B, a waveform 1201 is a waveform of the signal which is output by the arithmetic device 215; a waveform 1202 is a waveform of the pulse signal which is output by the resonance controller 216; and a waveform 1203 is a waveform of the output voltage $V_{out}$ from the resonant switching power supply 200. A waveform 1211 is a waveform of the signal which is output by the soft start circuit 16; a waveform 1212 is a waveform of the pulse signal which is output by the resonance controller 17; and a waveform 1213 is a waveform of the output voltage $V_{out}$ from the resonant switching power supply 1.

In the resonant switching power supply 200, the resonance controller 216 continuously receives the control instruction signal OE from the arithmetic device 215 upon startup. Therefore, the output voltage $V_{out}$ is rapidly raised to the minimum control voltage $V_{ctrl}$. In the resonant switching power supply 1, the resonance controller 17 discontinuously receives the second control instruction signal OE' from the soft start circuit 16 upon startup. Therefore, the output voltage $V_{out}$ is mildly raised to the minimum control voltage $V_{ctrl}$. For example, when the rise transition time spent upon startup of the resonant switching power supply 200 is represented by t and the rise transition time spent upon startup of the resonant switching power supply 1 is represented by t', t<t'.

Figure 13A:
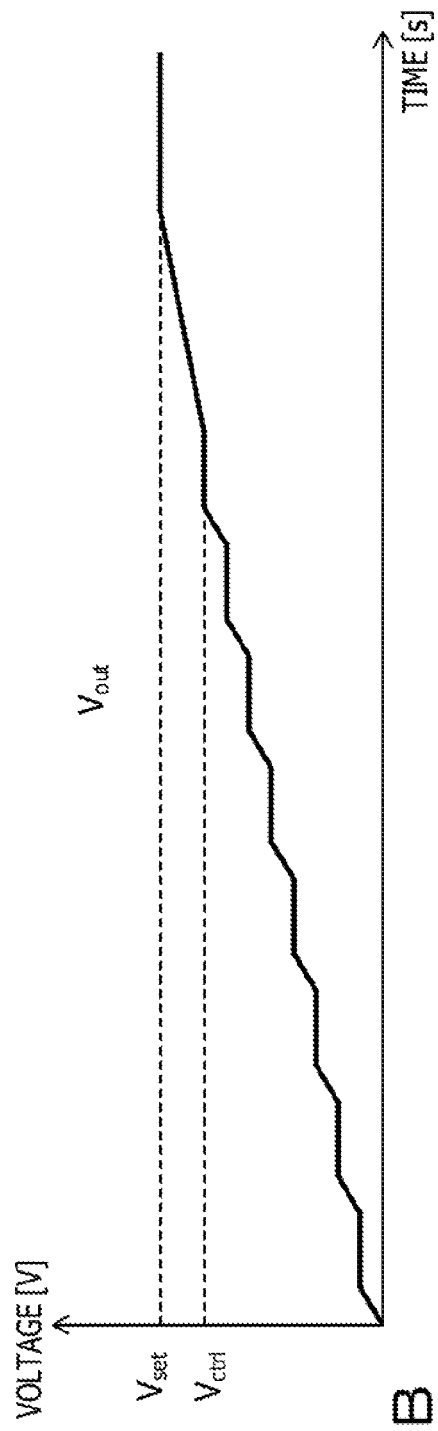
FIGS. 13A and 13B illustrate an exemplary relationship between output voltage and inrush current.
Figure 13B:
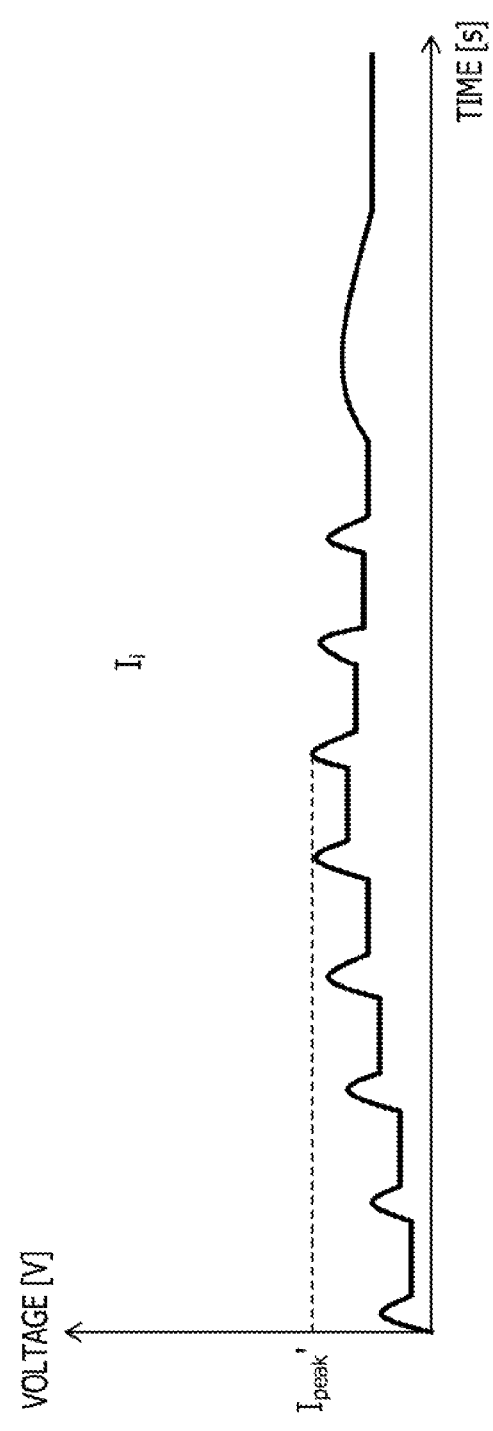

FIGS. 13A and 13B illustrate an exemplary relationship between the output voltage and the inrush current. FIGS. 13A and 13B illustrate the relationship between the output voltage $V_{out}$ and the inrush current $I_i$ which is obtained upon startup of the resonant switching power supply 1. FIG. 13A illustrates the output voltage $V_{out}$ of the resonant switching power supply 1. FIG. 13B illustrates the inrush current $I_i$ of the resonant switching power supply 1.

The inrush current $I_i$ rises in a period in which the first switching element 23 and the second switching element 24 are turned on/off so that the output voltage $V_{out}$ is raised. In the resonant switching power supply 1, the maximum value $I_{peak'}$ of the inrush current $I_i$ is smaller than the maximum value $I_{peak}$ of the inrush current $I_i$ of the resonant switching power supply 200 illustrated in FIG. 6C. This is because the output voltage $V_{out}$ of the resonant switching power supply 1 is mildly raised with first switching element 23 and the second switching element 24 being discontinuously turned on/off.

Figure 14:
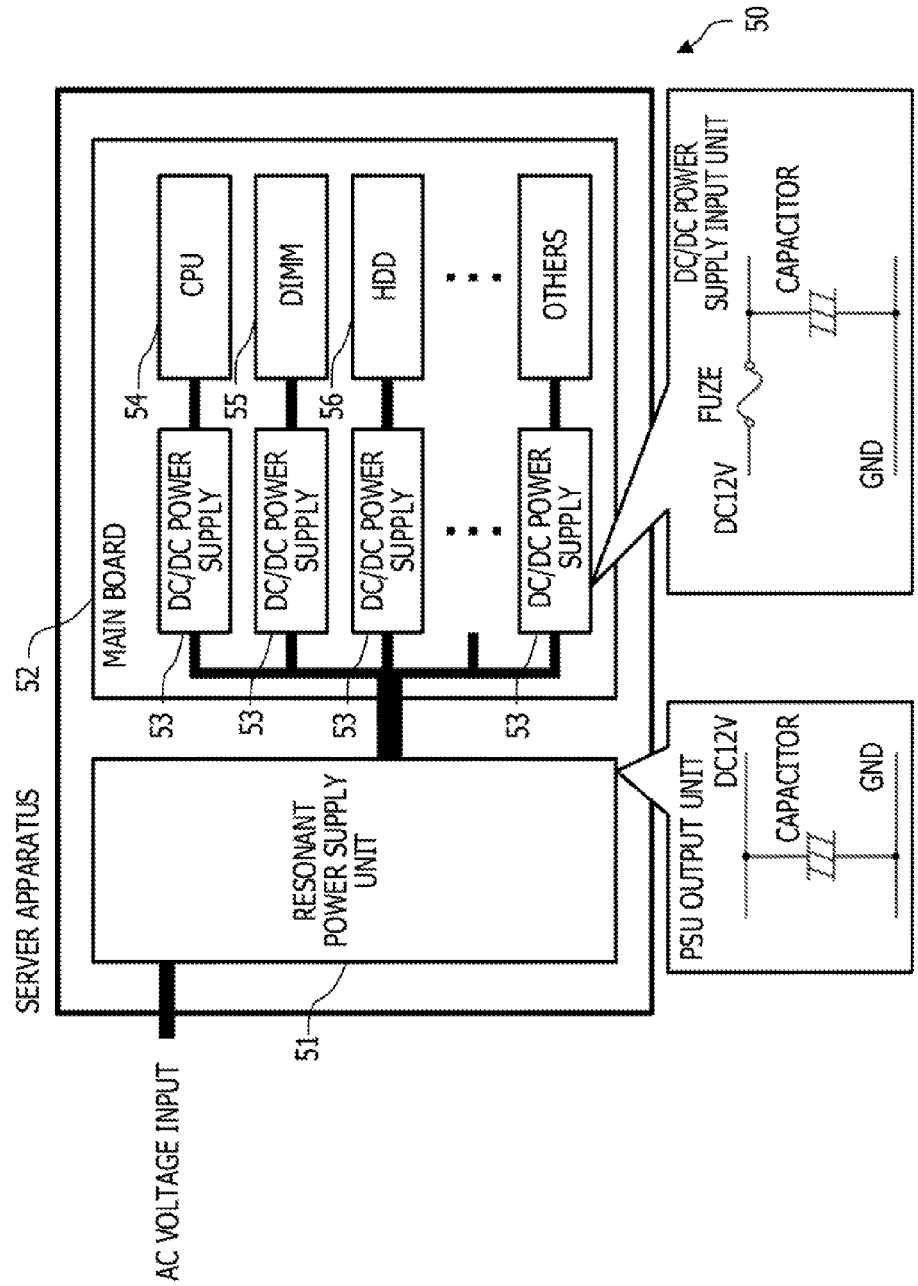
FIG. 14 illustrates an exemplary server apparatus.

FIG. 14 illustrates an exemplary server apparatus. FIG. 14 illustrates a server apparatus including the resonant switching power supply illustrated in FIG. 7.

A server apparatus 50 includes a resonant power supply unit 51 including the resonant switching power supply 1, and a main board 52. The main board 52 includes multiple DC/DC power supplies 53, a central processing unit (CPU) 54, a dual in-line memory module (DIMM) 55, a hard disk drive (HDD) 56, and the like which are supplied with power supply voltages from the respective DC/DC power supplies 53. For example, the output voltage of the resonant power supply unit 51 may be DC 12 V. For example, the power supply voltages for the CPU 54, a memory including the DIMM 55, the HDD 56, and the like, which are mounted on the main board 52, may be a DC voltage of 1 V, 3.3 V, 5 V, or the like, which is lower than the output voltage of the resonant power supply unit 51. The DC/DC power supplies 53 perform DC/DC conversion of the output voltage of the resonant power supply unit 51 into direct-current voltages which are used as the power supply voltages for the CPU 54, the DIMM 55, the HDD 56, and the like, and decrease the resulting voltages.

Since the resonant power supply unit 51 includes the resonant switching power supply 1 with which a soft start is capable of being performed, the maximum value of the inrush current $I_i$ may be decreased. Since the maximum value of the inrush current $I_i$ is decreased, no degradation may occur in a smoothing capacitor included in the resonant power supply unit 51 and input capacitors included in the DC/DC power supplies 53 due to the inrush current $I_i$. No fuses included in the DC/DC power supplies 53 may be cut due to the inrush current $I_i$. In the server apparatus 50, occurrence of a halt of an operation due to occurrence of various failures caused by the inrush current $I_i$ of the resonant power supply unit 51 may be reduced.

In the resonant switching power supply, when the output voltage is lower than the threshold voltage upon startup, the soft start circuit discontinuously outputs the control instruction signal to the resonance controller which controls the switching circuit, whereby a soft start may be performed. In the resonant switching power supply, the soft start circuit is added to an existing resonant switching power supply, whereby a soft start may be performed.

For example, in the resonant switching power supply 1, the soft start circuit 16 may be disposed between the arithmetic device 15 and the resonance controller 17, or may be embedded in the arithmetic device 15. In the resonant switching power supply 1, a soft start function may be performed in such a manner that the soft start circuit 16 is mounted, or the soft start function may be performed by using a software program included in the arithmetic device.

Figure 15:
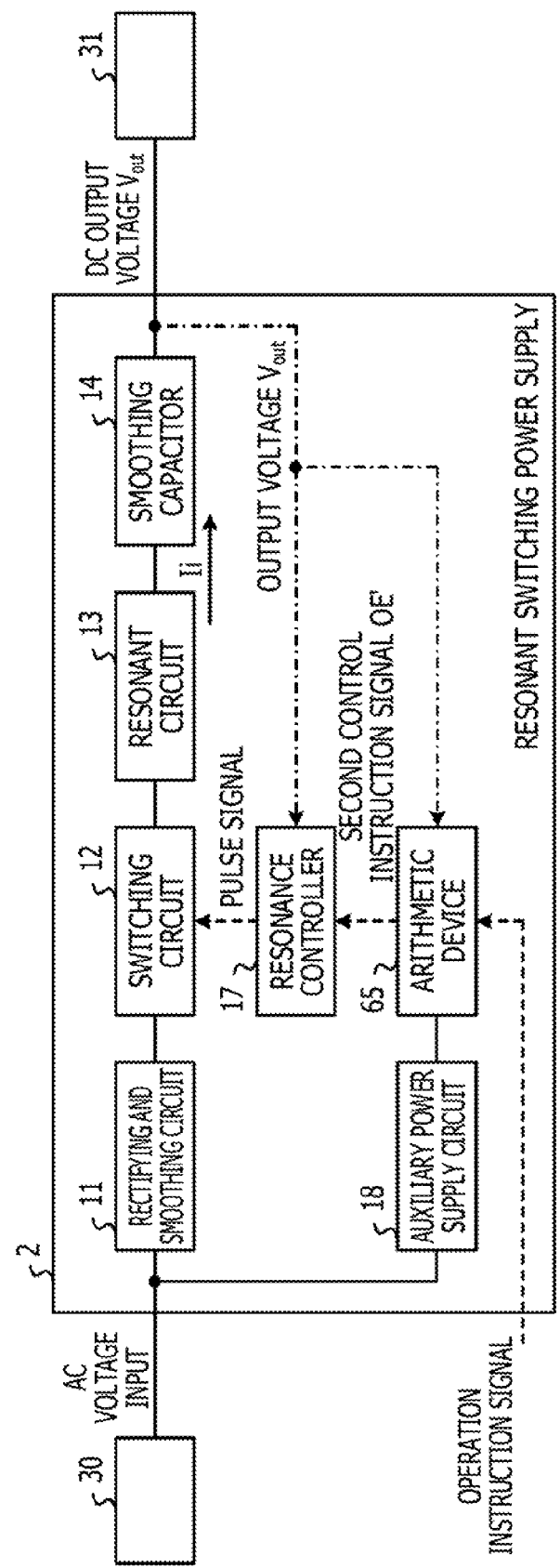
FIG. 15 illustrates an exemplary resonant switching power supply.

FIG. 15 illustrates an exemplary resonant switching power supply.

A resonant switching power supply 2 is different from the resonant switching power supply 1 illustrated in FIG. 7 in that an arithmetic device 65 is disposed instead of the arithmetic device 15, and in that the soft start circuit 16 is not provided. The configurations and the functions of the resonant switching power supply 2 other than those of the arithmetic device 65 may be substantially the same as or similar to those of the resonant switching power supply 1 illustrated in FIG. 7, and no description may be made. The arithmetic device 65 includes a software program for achieving the soft start function. The arithmetic device 65 may be coupled to a computer-readable recording medium which is capable of storing a program for a process performed by the arithmetic device 65. As the recording medium, a portable recording medium, such as a compact disc-read-only memory (CD-ROM), a digital versatile disk (DVD), and a Universal Serial Bus (USB) memory, a semiconductor memory such as a flash memory, a hard disk drive, and the like are used.

Figure 16:
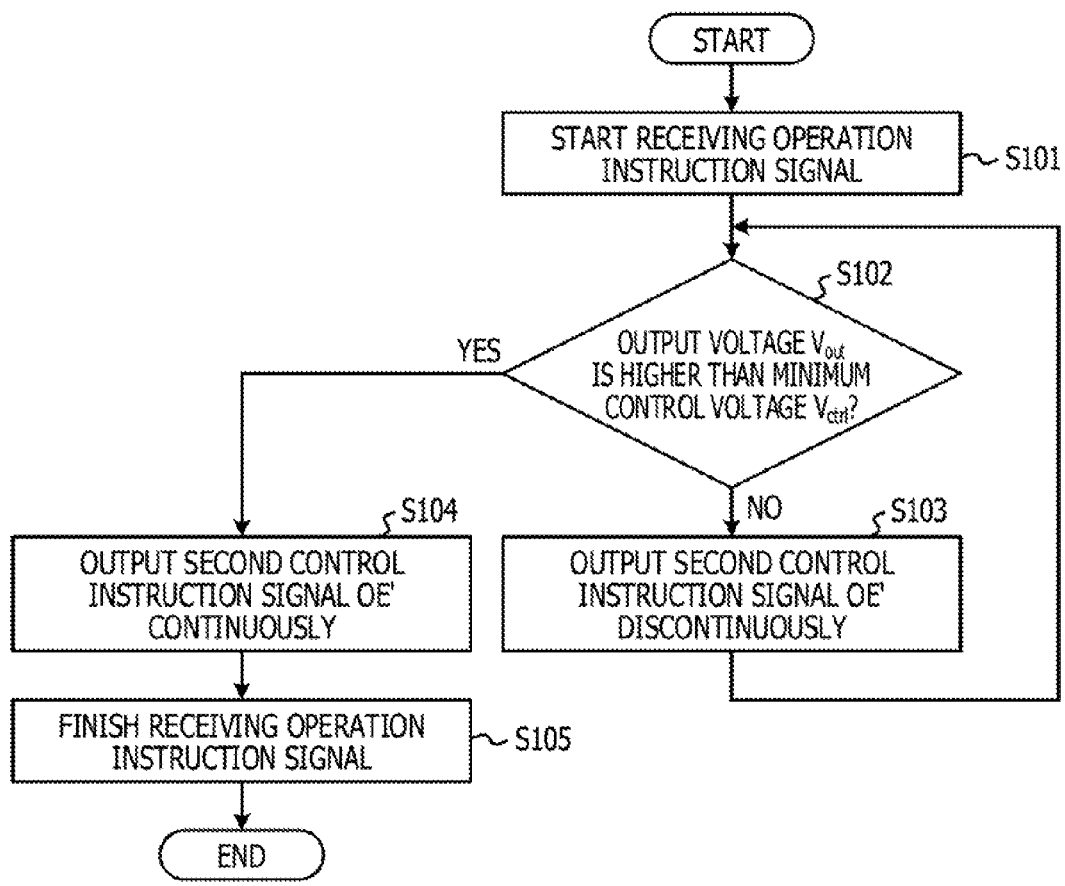
FIG. 16 illustrates an exemplary soft start process.

FIG. 16 illustrates an exemplary soft start process. FIG. 16 illustrates a soft start process based on the software program included in the arithmetic device illustrated in FIG. 15. The arithmetic device 65 performs the soft start process illustrated in FIG. 16 upon startup of the resonant switching power supply 2.

When the arithmetic device 65 starts receiving an operation instruction signal from the host control apparatus (S101), the arithmetic device 65 determines whether or not the output voltage $V_{out}$ of the resonant switching power supply 2 is higher than the minimum control voltage $V_{ctrl}$ (S102). The output voltage $V_{out}$ of the resonant switching power supply 2 may be 0 V, which is lower than the minimum control voltage $V_{ctrl}$. Therefore, the arithmetic device 65 discontinuously outputs the second control instruction signal OE' (S103). Until the arithmetic device 65 determines that the output voltage $V_{out}$ of the resonant switching power supply 2 is higher than the minimum control voltage $V_{ctrl}$ (S102), the arithmetic device 65 repeatedly performs the processes of S102 to S103. If the arithmetic device 65 determines that the output voltage $V_{out}$ of the resonant switching power supply 2 is higher than the minimum control voltage $V_{ctrl}$ (S102), the arithmetic device 65 continuously outputs the second control instruction signal OE' (S104). When the arithmetic device 65 finishes receiving the operation instruction signal from the host control apparatus (S105), the arithmetic device 65 ends the process.

In the resonant switching power supply illustrated in FIG. 15, since the arithmetic device has a software program having the soft start function, the soft start process is performed without adding hardware.

For example, in the resonant switching power supply illustrated in FIG. 7, the pulse generator 43 of the soft start circuit 16 generates a pulse signal having a certain frequency and a certain duty ratio. For example, in the resonant switching power supply, at least one of the frequency and the duty ratio of the pulse signal generated by the pulse generator of the soft start circuit may be changed.

Figure 17A:
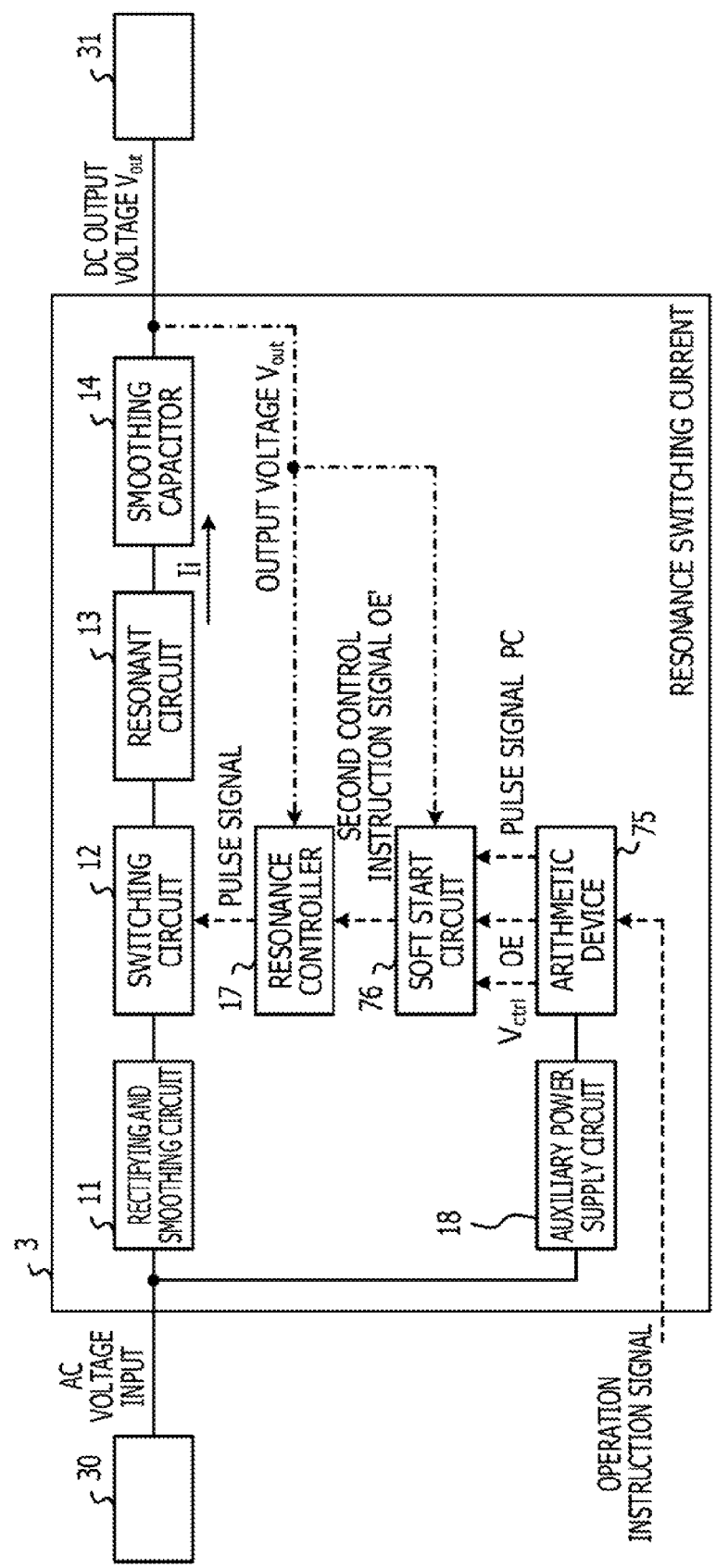
FIG. 17A illustrates an exemplary resonant switching power supply.
Figure 17B:
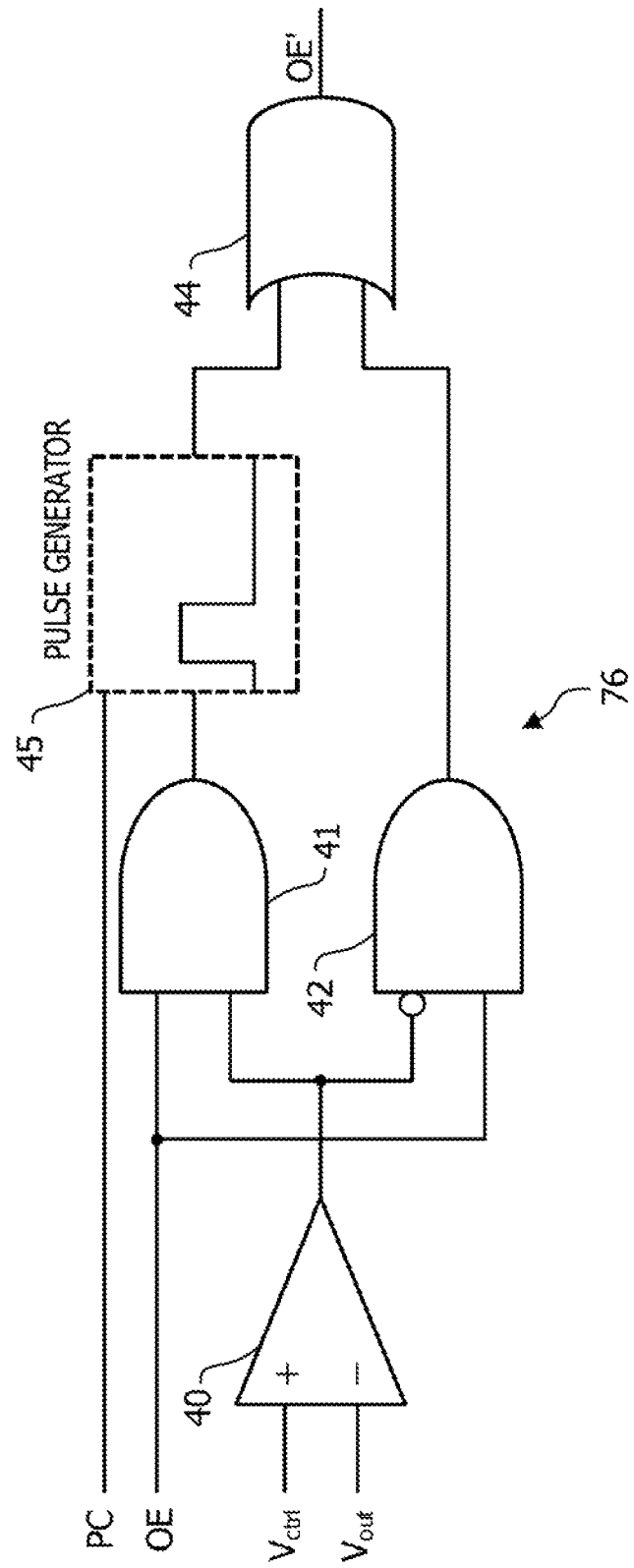
FIG. 17B illustrates an exemplary soft start circuit.

FIG. 17A illustrates an exemplary resonant switching power supply. FIG. 17B illustrates an exemplary soft start circuit. The soft start circuit illustrated in FIG. 17B may be the soft start circuit in FIG. 17A.

A resonant switching power supply 3 is different from the resonant switching power supply 1 illustrated in FIG. 7 in that an arithmetic device 75 is disposed instead of the arithmetic device 15 and in that a soft start circuit 76 is disposed instead of the soft start circuit 16. The configurations and the functions of the resonant switching power supply 3 other than those of the arithmetic device 75 and the soft start circuit 76 may be substantially the same as or similar to those of the resonant switching power supply 1 illustrated in FIG. 7, and no detailed description may be made.

The arithmetic device 75 is different from the arithmetic device 15 illustrated in FIG. 7 in that a pulse control signal PC which specifies the frequency and the duty ratio of the pulse signal generated by the soft start circuit 76 is output to the soft start circuit 76. The duty ratio of the pulse signal generated by the soft start circuit 76 is changed, whereby, when the second control instruction signal OE' is discontinuously output, the time in which the second control instruction signal OE' is output in one cycle is changed. The soft start circuit 76 is different from the soft start circuit 16 illustrated in FIG. 7 in that a pulse generator 45 which generates a pulse signal having the frequency and the duty ratio which correspond to the pulse control signal PC received from the arithmetic device 75 is disposed instead of the pulse generator 43.

The resonant switching power supply changes the frequency and the duty ratio of the pulse signal generated by the soft start circuit, thereby setting the rise transition time of the output voltage $V_{out}$ which is spent upon startup, to a desired value. When a rapid rise of the power supply voltage is desired for the load coupled to the resonant switching power supply, the arithmetic device 75 outputs the pulse control signal PC which causes an increase in the frequency of the pulse signal generated by the soft start circuit or an increase in the duty ratio. When a decrease in the inrush current is desired for the load coupled to the resonant switching power supply, the arithmetic device 75 outputs the pulse control signal PC which causes a decrease in the frequency of the pulse signal generated by the soft start circuit or an decrease in the duty ratio.

In the resonant switching power supply, the switching circuit 12 has MOSFETs coupled to each other in series. Alternatively, as the switching circuit, another switching element which is capable of performing switching at a frequency close to the resonant frequency of the LC circuit of the resonant circuit may be employed.

In the above-described resonant switching power supply, the LC circuit of the resonant circuit 13 may include the resonant capacitor 25 and the primary coil of the transformer 26, or another coil may be disposed instead of the primary coil of the transformer 26. In the above-described resonant switching power supply, the resonant capacitor 25 is coupled to the primary coil of the transformer 26 in series. Alternatively, the resonant capacitor may be coupled to the primary coil of the transformer 26 in parallel.

Figure 18:
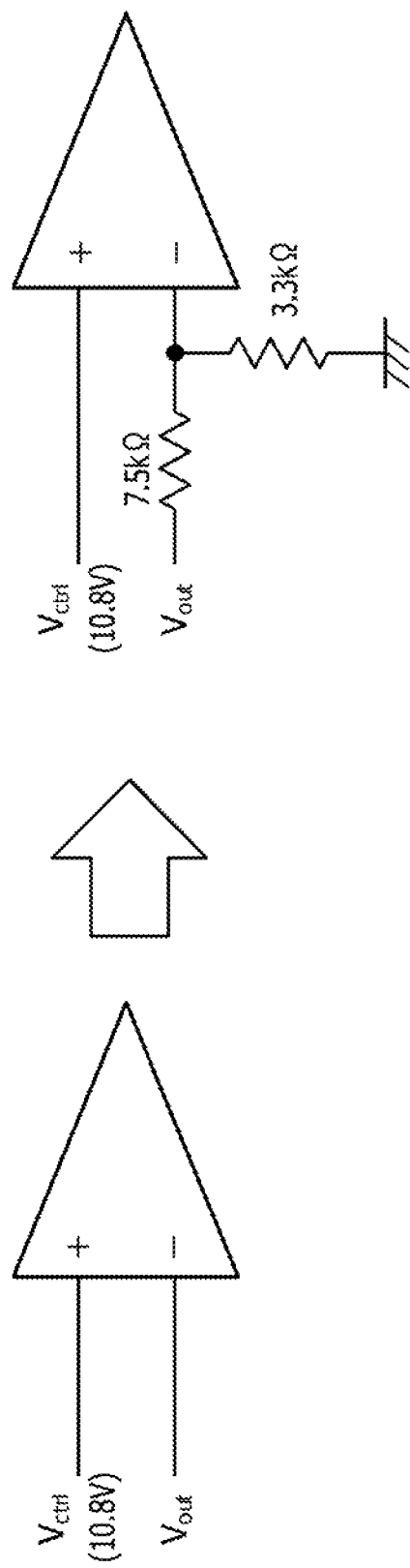
FIG. 18 illustrates exemplary voltages which are input to the comparator in a soft start circuit.

In the above-described resonant switching power supply, the comparator of the soft start circuit receives the minimum control voltage $V_{ctrl}$ and the output voltage $V_{out}$. Alternatively, another threshold voltage may be received instead of the minimum control voltage $V_{ctrl}$. FIG. 18 illustrates exemplary voltages which are input to the comparator in a soft start circuit. FIG. 18 illustrates the voltages received by the comparator of the soft start circuit illustrated in FIGS. 7 and 15. As illustrated in FIG. 18, the comparator of the soft start circuit may receive a voltage obtained by dividing the output voltage $V_{out}$, instead of the output voltage $V_{out}$. As illustrated in FIG. 18, the comparator receives the voltage obtained by dividing the output voltage $V_{out}$, whereby the arithmetic device outputs a voltage lower than the minimum control voltage $V_{ctrl}$, as the threshold voltage. For example, in the case where the power supply voltage of the arithmetic device is 3.3 V or 5 V and where the minimum control voltage $V_{ctrl}$ is 10.8 V, the arithmetic device may hardly output the minimum control voltage $V_{ctrl}$ easily. Therefore, the comparator receives the voltage obtained by dividing the voltage $V_{out}$, whereby the arithmetic device may output a threshold voltage according to the power supply voltage.

The resonant switching power supply illustrated in FIG. 17A includes the pulse generator 45 which is capable of changing the frequency and the duty ratio of the generated pulse signal. Alternatively, the function of the pulse generator 45 may be performed by using a software program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A switching power supply comprising:
   a resonant circuit including a capacitor and a coil coupled to the capacitor;
   a switching circuit including a switching element and configured to supply a voltage to the resonant circuit;
   a smoothing circuit configured to smooth a voltage output from the resonant circuit and outputs an output voltage;
   a resonance controller configured to, when a control instruction signal is input cause the switching element to be turned on and off at a first frequency in such a manner that the output voltage becomes a specific voltage, the control instruction signal indicating to control the switching circuit; and
   a controller configured to discontinuously output the control instruction signal to the resonance controller at a second frequency being lower than the first frequency after an operation instruction signal is input until the output voltage becomes higher than a threshold voltage, and continuously output the control instruction signal to the resonance controller after the output voltage becomes higher than the threshold voltage until the operation instruction signal is not input, the operation instruction signal indicating to perform an operation.

2. The switching power supply according to claim 1, wherein the controller includes:
   an arithmetic device configured to output a first control instruction signal while the operation instruction signal is input, the first control instruction signal indicating that the operation instruction signal is input; and
   a soft start circuit coupled to the arithmetic device and configured to output the control instruction signal based on the first control instruction signal and the output voltage.

3. The switching power supply according to claim 2, wherein the soft start circuit discontinuously outputs the control instruction signal to the resonance controller at the second frequency after the first control instruction signal is input from the arithmetic device, until the output voltage becomes higher than the threshold voltage, and continuously outputs the control instruction signal to the resonance controller after the output voltage becomes higher than the threshold voltage, until the first control instruction signal is not input.

4. The switching power supply according to claim 1, wherein the controller is capable of changing at least one of the second frequency and a period of time in which the control instruction signal is output in one cycle when the control instruction signal is discontinuously output at the second frequency.

5. The switching power supply according to claim 2, wherein the soft start circuit includes:
   a comparator configured to receive the output voltage and the threshold voltage;
   a logic circuit configured to receive the first control instruction signal and an output from the comparator; and
   a pulse generator configured to output a pulse signal based on an output from the logic circuit.

6. A method for controlling a switching power supply, the method comprising:
   controlling, when a control instruction signal indicating to control a switching circuit is input, the switching circuit by using a signal having a first frequency in such a manner that an output voltage of a resonant circuit becomes a specific voltage, the switching circuit outputting a voltage to the resonant circuit including a capacitor and a coil;
   controlling the switching circuit by discontinuously outputting a signal having a second frequency lower than the first frequency after an operation instruction signal indicating to perform an operation is input, until the output voltage becomes higher than a threshold voltage; and controlling the switching circuit by continuously outputting the signal having the second frequency after the output voltage becomes higher than the threshold voltage, until the operation instruction signal is not input.

7. A power supply system comprising:

a resonant circuit including a capacitor and a coil coupled to the capacitor;

a switching circuit including a switching element and configured to supply a voltage to the resonant circuit;

a smoothing circuit configured to smooth a voltage output from the resonant circuit and output an output voltage;

a resonance controller configured to, when a control instruction signal is input cause the switching element to be turned on and off at a first frequency in such a manner that the output voltage becomes a specific threshold voltage, the control instruction signal indicating to control the switching circuit; and an arithmetic unit configured to control the resonance controller, wherein the arithmetic unit discontinuously outputs the control instruction signal to the resonance controller at a second frequency being lower than the first frequency after an operation instruction signal is input, until the output voltage becomes higher than a threshold voltage, and continuously outputs the control instruction signal to the resonance controller after the output voltage becomes higher than the threshold voltage, until the operation instruction signal is not input, the operation instruction signal indicating to perform an operation.

8. The power supply system according to claim 7, wherein the arithmetic unit configured to output a first control instruction signal while the operation instruction signal is input, the first control instruction signal indicating that the operation instruction signal is input, and a soft start circuit, coupled to the arithmetic unit, is configured to output the control instruction signal based on the first control instruction signal and the output voltage.

9. The power supply system according to claim 8, wherein the soft start circuit discontinuously outputs the control instruction signal to the resonance controller at the second frequency after the first control instruction signal is input from the arithmetic unit, until the output voltage becomes higher than the threshold voltage, and continuously outputs the control instruction signal to the resonance controller after the output voltage becomes higher than the threshold voltage, until the first control instruction signal is not input.

10. The power supply system according to claim 7, wherein the arithmetic unit is capable of changing at least one of the second frequency and a period of time in which the control instruction signal is output in one cycle when the control instruction signal is discontinuously output at the second frequency.

11. The power supply system according to claim 8, wherein the soft start circuit includes:

a comparator configured to receive the output voltage and the threshold voltage;

a logic circuit configured to receive the first control instruction signal and an output from the comparator; and a pulse generator configured to output a pulse signal based on an output from the logic circuit.

* * * * *